(12) United States Patent
McDowell

(10) Patent No.: US 7,268,939 B1
(45) Date of Patent: Sep. 11, 2007

(54) TRACKING OF CELLS WITH A COMPACT MICROSCOPE IMAGING SYSTEM WITH INTELLIGENT CONTROLS

(75) Inventor: Mark McDowell, Cleveland, OH (US)

(73) Assignee: The United States of America as represented by the Administrator of National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 11/363,300

(22) Filed: Feb. 24, 2006

Related U.S. Application Data

(60) Continuation-in-part of application No. 11/053,759, filed on Feb. 4, 2005, now abandoned, which is a division of application No. 10/645,999, filed on Aug. 21, 2003, now abandoned.

(51) Int. Cl.
*G02B 23/32* (2006.01)

(52) U.S. Cl. .................................................... 359/368
(58) Field of Classification Search ................ 359/368, 359/369, 382, 383, 385, 391, 396–398
See application file for complete search history.

(56) References Cited

U.S. PATENT DOCUMENTS

| | | | | |
|---|---|---|---|---|
| 4,202,037 A | * | 5/1980 | Glaser et al. | ................ 345/632 |
| 4,965,725 A | * | 10/1990 | Rutenberg | ................. 382/224 |
| 5,733,721 A | | 3/1998 | Hemstreet | |
| 5,784,193 A | | 7/1998 | Ferguson | |
| 6,285,498 B1 | * | 9/2001 | Mayer | ........................ 359/392 |
| 6,678,413 B1 | * | 1/2004 | Liang et al. | ................ 382/181 |
| 2006/0083423 A1 | * | 4/2006 | Brown et al. | ................ 382/159 |

* cited by examiner

*Primary Examiner*—Stephone B. Allen
*Assistant Examiner*—Joshua L Pritchett
(74) *Attorney, Agent, or Firm*—Kent N. Stone

(57) ABSTRACT

A Microscope Imaging System (CMIS) with intelligent controls is disclosed that provides techniques for scanning, identifying, detecting and tracking microscopic changes in selected characteristics or features of various surfaces including, but not limited to, cells, spheres, and manufactured products subject to difficult-to-see imperfections. The practice of the present invention provides applications that include colloidal hard spheres experiments, biological cell detection for patch clamping, cell movement and tracking, as well as defect identification in products, such as semiconductor devices, where surface damage can be significant, but difficult to detect. The CMIS system is a machine vision system, which combines intelligent image processing with remote control capabilities and provides the ability to autofocus on a microscope sample, automatically scan an image, and perform machine vision analysis on multiple samples simultaneously.

1 Claim, 26 Drawing Sheets

TRACKING OF CELLS WITH A COMPACT MICROSCOPE IMAGING SYSTEM WITH INTELLIGENT CONTROLS

CROSS-REFERENCE TO RELATED APPLICATIONS

This application is a continuation-in-part of application Ser. No. 11/053,759, filed Feb. 4, 2005 now abandoned, which is a divisional application of parent case Ser. No. 10/645,999, which was filed on Aug. 21, 2003 now abandoned.

ORIGIN OF THE INVENTION

The invention described herein was made by an employee of the United States Government and may be used by or for the Government for governmental purposes without payment of any royalties thereon or therefor.

FIELD OF THE INVENTION

The invention relates to a Compact Microscopic Imaging System (CMIS) with intelligent controls. Specifically, the invention relates to a CMIS that provides techniques for scanning, identifying, detecting and tracking microscopic changes and selected characteristics or features of various surfaces included, but not limited to, cells, spheres, and manufactured products subject to difficult-to-see imperfections. The CMIS provides intelligence to allow experiments to be conducted without the need of constant or even human monitoring and utilizes an Adaptive Morphological Feature Based Object Classifier (AMFBOC) for capturing images.

BACKGROUND OF THE INVENTION

Microscope experiments are typically conducted by humans utilizing microscopes that provide enlarged images of minute objects or specimens being analyzed. The successful results of these experiments are dependent upon the concentration, endurance, and constant monitoring of a human operating the microscope. Sometimes the human operator of the microscope on a daily basis loses concentration, becomes fatigued as the day goes on, or becomes distracted with all these factors contributing to unsuccessful experiments. It is desired that a system be provided that allows experiments to be conducted using microscope, but without the need of intervention by a human.

OBJECTS OF THE INVENTION

It is a primary object of the present invention to provide a system that allows experiments to be conducted utilizing microscopes, but without the need of human intervention.

It is another object of the present invention to allow experiments to be conducted without the need of human intervention and without the need of constant monitoring.

It is a further object of the present invention to provide a system for analyzing microscope experiments automatically and remotely.

It is a further object of the present invention to provide a system that utilizes intelligence and controls the operation of the system by the use of adaptive neural networks.

It is a still further object of the present invention to provide an adaptive neural network that is primarily based on a probabilistic feature mapping objects in a selected image by utilizing no less than thirteen (13) feature metrics.

Still further, it is an object of the present invention to provide for a system that scans to find areas of interest, focuses and acquires images automatically.

In addition, it is an object of the present invention to provide a system to evaluate surfaces of devices, such as semiconductors, to ascertain the quality thereof.

SUMMARY OF THE INVENTION

The present invention is directed to a Microscope Imaging System (CMIS) that utilizes intelligent controls and provides techniques for scanning, identifying, detecting and tracking microscopic changes in selected characteristics or features of various objects including, but not limited to, cells, spheres and manufactured products subject to difficult-to-see imperfections.

In one embodiment, an imaging system for examining specimens is provided comprising: a video microscope comprising a holder for specimens and a camera located so as to be focussed on the holder. The imaging system further comprises a light source operatively connected to the video microscope, and a robotic system operatively connected to and for positioning the video microscope. The imaging system further comprises a computer operatively connected to the camera and to the robotic system. The computer has operating programs comprising routines for providing machine vision techniques for scanning, identifying, detecting and tracking selected characteristics and features of the specimen being analyzed. The machine vision techniques include routines for an adaptive morphological feature based object classifier employing a probabilistic feature mapping of objects in a selected image by utilizing no less than thirteen (13) feature metrics comprising; bounding box (FM1), intensity-weighted center of mass (FM2), intensity/color statistics (FM3), major axis length (FM4), minor axis length (FM5), major axis orientation, theta, (FM6), area (FM7), elongation (FM8), roundness (FM9), smoothness (FM10), partiality (FM11), circumference (FM12), and perimeter count (FM13), wherein the routines for producing machine vision techniques comprise a routine that identifies one or more cells in an area of interest, which cell is closest to the center of the area of interest, the nearest neighbors of each cell within the area of interest, and track movement of the cells within the area of interest; the routine for the identification of all cells comprises the steps of: a) placing the one or more cells comprising a specimen in the holder; b) causing the video microscope to generate an electronic image of the one or more cells, each of said one or more cells of the electronic image having a dark outer ring; c) examining the dark outer ring of each cell so as to determine the shape and size of each of the one or more cells; and d) performing an intensity weighted center of mass technique utilizing the shape and size of each cell to determine the center of each cell which, in turn, defines the position of each cell relative to each other, wherein the area enclosing the positions of the one or more cells along with outer ring of each cell defining the perimeters of the one or more cells determines said area of interest.

BRIEF DESCRIPTION OF THE DRAWINGS

The features and advantage of the invention, as well as the invention itself, will be better understood with reference to the following description when considered in conjunction with the accompanying drawings, wherein like reference numbers designate identical corresponding parts thereof and wherein.

DETAILED DESCRIPTION OF THE PREFERRED EMBODIMENTS

Figure 1:
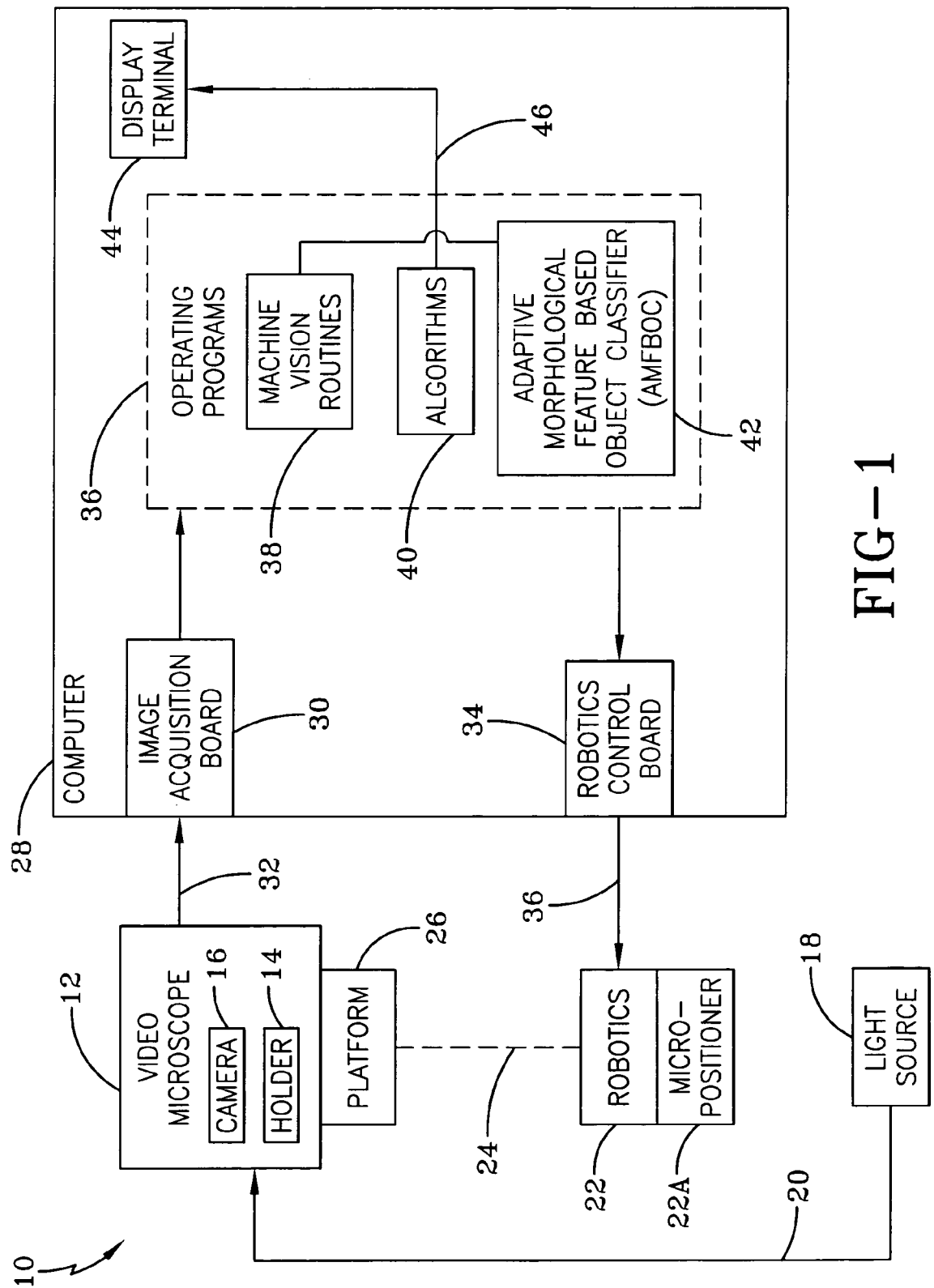
FIG. 1 is a block diagram of the imaging system of the present invention.

Referring to FIG. 1, there is shown a block diagram of Compact Microscope Imaging System 10 of the present invention particularly suited to perform microscope analysis.

As will be further described, the Compact Microscope Imaging System (CMIS) 10, sometimes referred to herein simply as an imaging system, is a diagnostic tool with intelligent controls for use in space, industrial, medical, and security applications. The CMIS 10 can be used in-situ with a minimum amount of user intervention and it can be used to scan, find areas of interest, focus, and acquire images all automatically.

The CMIS 10 provides machine vision techniques in order to achieve the goal of being an intelligent microscope capable of several automated tasks and able to reproduce human microscope system interactions with accuracy and repeatability. The CMIS 10 may be used to replace what humans do with microscopes on a daily basis. Unlike human operation, the CMIS 10 will not lose concentration, become fatigued as the day goes on, or become distracted like a human might.

A wide variety of applications that can take advantage of the CMIS 10 having intelligent controls for usage in fields such as materials science, fluids science, life sciences, biotechnology and production monitoring for quality control where human visualization of a cell or surface is difficult. These include experiments involve dendrite growth, transparent system coarsening and sintering, soil mechanics (including lunar and Martian experiments), colloid science, magneto and electro-rheological fluids, details of flow around bubbles, particle pushing and engulfment, foam behavior, protein and zeolite crystal growth, examination of living systems and microscopic or extremely small defects in high value parts. Large numbers of multiple cell experiments require microscopy for in-situ observations; this is feasible with the CMIS 10.

In general, the CMIS 10 provides machine vision techniques characterized as follows: (1) adaptive thresholdings which optimally determines the best method to achieve the image contrast needed for image processing; (2) auto-focus which provides the ability to focus on a sample automatically utilizing a Cartesian robot system; (3) auto-imaging scanning which enables a microscope to scan left, right, up, down, back, and forth within a sample in order to find the object of interest; (4) object identification and classification which enables the finding, classifying and labeling of objects in a pre-determined area of interest; (5) motion detection which enables the observing and quantifying of the movement of objects in a pre-determined area of interest; and (6) transition mapping which enables the detection of small transitions between groups of cells used for microscope experiments such as order/disorder, large objects/small objects, light/dark regions and movement/non-movement. Transition mapping is particularly helpful in determining the exact transition location of the quasi-zone, which is in-between two phases in a microscope image.

To further appreciate the benefits of the present invention the CMIS 10 will be further described hereinafter for four (4) methods which are: (1) interface detection in colloidal hard spheres systems; (2) auto-focus for compact microscope systems; (3) cell identification and classification for biomedical applications and (4) surface defect classification. The overall operation may be further described with reference to FIG. 1.

The CMIS 10 comprises a video microscope 12, which, in turn, comprises a holder 14 and a camera 16 located, so as to be focused on the holder 14. The CMIS 10 further comprises light source 18 that is operatively connected to the video camera 12 via signal path 20 and provides for illumination of any specimens being held in the holder 14. The CMIS 10 further comprises a robotic system 22 response to electrical signals and which is operatively connected to the video microscope 12 by way of control path 24 and preferably by way of platform 26 upon which the video microscope 12 resides. The robotic system 22 preferably further comprises a micro-positioner 22A.

The CMIS 10 further comprises a computer 28 that is operatively connected to the camera 16 by way of an image acquisition board 30 and signal path 32. The computer 28 further provides electrical signals and is operatively connected to the robotic system 22 by way of a robotic control board 34 and signal path 36.

The operation of the computer 28 is controlled by its operating programs 36, which are comprised of machine vision routines 38, algorithms 40 and routines for an Adaptive Morphological Feature Based Object Classifier (AMFBOC) 42 to be further described hereinafter. The operating programs 36 provide visual verification of the results of the performed testing, to be described, on display terminal 44, via signal path 46.

The video microscope 12 is preferably compact and may be of the type that are made commercially available by various companies such as Fuji, Sony, Edmund Scientific and Zeiss. The camera 16 is preferably comprised of coupled devices and the camera 16 feeds the data to the acquisition board 30 by way of the signal path 32. The camera 16 provides an output representative of the electronic image of the specimen being held in holder 14.

The light source 18 is preferably a fiber-optic, which may be of the type that are made commercially available by various companies, such as Cuda Products, Thor Labs and Semiconductor International. The robotic system 22 is preferably of a Cartesian type and provides three (3) dimensional positioning of the video microscope 12 which, in turn, provides three (3) dimensional positioning of the specimen being held in the holder 14, as well as the camera 16. The robotic system 22 may be of the type that are made commercially available by various companies, such as Parker Hanifin, Dadel Inc., and Physic Instruments. The operating programs 36 residing in the computer 28 further comprise routines (known in the art) for controlling the robotic system which, in turn, control the positioning of the video microscope 12.

The algorithms 40, to be further described hereinafter, operatively cooperate with routines that are part of a machine vision routines that provide for scanning, identifying, detecting and tracking selected characteristics and features of the many specimens capable of being analyzed by the CMIS 10.

The Adaptive Morphological Feature Based Object Classifier (AMFBOC) 42 is used for the detection and analysis of objects in images captured by the CMIS 10 imaging system. This AMFBOC 42 is primarily based on a probabilistic feature mapping of each object in a selected image by utilizing no less than thirteen (13) Feature Metrics (FM) given as follows and all to be further defined herein: bounding box (FM1), intensity-weighted center of mass (FM2), intensity/color statistics (FM3), major axis length (FM4), minor axis length (FM5), major axis orientation, theta, (FM6), area (FM7), elongation (FM8), roundness (FM9), smoothness (FM10), partiality (FM11), circumference (FM12), and perimeter count (FM13).

An object's bounding box (FM1) is the smallest rectangle aligned with the image coordinate system that completely encompasses the object. More particularly, a bounding box (FM1) consists of 4 points with coordinates $\{(^j\text{min}, ^i\text{min}), (^j\text{max}, ^i\text{min}), (^j\text{min}, ^i\text{max}), (^j\text{max}, ^i\text{max})\}$ where i=row pixel index and j=column pixel index and where:

| | |
|---|---|
| Top Left Corner = | $(^j\text{min}, ^i\text{min})$ |
| Top Right Corner = | $(^j\text{max}, ^i\text{min})$ |
| Bottom Left Corner = | $(^j\text{min}, ^i\text{max})$ |
| Bottom Right Corner = | $(^j\text{max}, ^i\text{max})$ |

The intensity-weighted center of Mass (FM2) provides the X, Y pixel position of the mass of the selected object. Color objects are treated as grayscale for the calculation of this feature (FM2).

The intensity-weighted center of the mass feature (FM2) is based on finding the center of the object using the following technique:

$$\bar{R}_{cm} = \left( \frac{\sum_{j=j\text{min}}^{j\text{max}} \sum_{i=i\text{min}}^{i\text{max}} [i \cdot f(j,i)]}{\sum_{j=j\text{min}}^{j\text{max}} \sum_{i=i\text{min}}^{i\text{max}} f(j,i)}, \frac{\sum_{j=j\text{min}}^{j\text{max}} \sum_{i=i\text{min}}^{i\text{max}} [j \cdot f(j,i)]}{\sum_{j=j\text{min}}^{j\text{max}} \sum_{i=i\text{min}}^{i\text{max}} f(j,i)} \right)$$

where:

$i_{min}$=minimum row index of the object (determined from bounding box)

$i_{max}$=maximum row index of the object (determined from bounding box)

$j_{min}$=minimum column index of the object (determined from bounding box)

$j_{max}$=maximum column index of the object (determined from bounding box)

f(j, i)=|background intensity−I(j, i)|

I(j, i)=intensity of pixel at column j, row i

The intensity/color statistics (FM3) calculates the average grayscale or color statistics of an object. More particularly, for a grayscale image the object's maximum, minimum and average gray value are determined along with the standard deviation for all non-background pixels in the object. For a color image the maximum, minimum, average and standard deviation are determined individually for the red, green and blue components for all non-background pixels in the object. Equations for the average intensity and standard deviation for the red component are shown below; grayscale and green/blue component equations are done similarly.

$$avg_R = \frac{\sum_{j=jmin}^{jmax} \sum_{i=imin}^{imax} I_R(j, i)}{Area}$$

$$\sigma_R = \sqrt{\frac{\sum_{j=jmin}^{jmax} \sum_{i=imin}^{imax} (I_R(j, i) - avg_R)^2}{Area}}$$

where:

$I_R(j, i)$=intensity of red component of pixel at column j, row i

The major axis length (FM4) is the length of the major axis of the object's bounding ellipse. It should be noted that the major axis length refers not to the bounding box, previously discussed, but to a bounding ellipse, to be further described hereinafter. This is the smallest ellipse (not necessarily aligned with the image's coordinate system) that completely encompasses the object.

The major axis length (FM4) may be defined by the equation given below:

$$\text{Major axis length} = \frac{2\sqrt{2}}{\sqrt{(d+f) - \sqrt{(d-f)^2 + 4e^2}}}$$

where d, f and e are given values of the standard ellipse equation $$\begin{pmatrix} d & e \\ e & f \end{pmatrix} \begin{pmatrix} v_1 \\ v_2 \end{pmatrix}$$

The minor axis length (FM5) is the length of the minor axis of the bounding ellipse. It should be noted that the minor axis length refers not to the bounding box, but to a bounding ellipse. This is the smallest ellipse (not necessarily aligned with the image's coordinate system) that completely encompasses the object.

The minor axis length (FM5) may be defined by the equation given below:

$$\text{Minor axis length} = \frac{2\sqrt{2}}{\sqrt{(d+f) + \sqrt{(d-f)^2 + 4e^2}}}$$

where d, f and e are given values of the standard ellipse equation $$\begin{pmatrix} d & e \\ e & f \end{pmatrix} \begin{pmatrix} v_1 \\ v_2 \end{pmatrix}$$

The major axis orientation, theta, (FM6) is the angle (in degrees) that the major axis makes with the image's x-axis.

The major axis orientation, theta, (FM6) may be defined by the equation given below:

$$\text{Major Axis Orientation, } \theta = \frac{1}{2}\tan^{-1}\frac{2e}{d - f}$$

where d, f and e are given values of the standard ellipse equation $$\begin{pmatrix} d & e \\ e & f \end{pmatrix} \begin{pmatrix} v_1 \\ v_2 \end{pmatrix}$$

The area (FM7) is the object's area defined by the number of non-background pixels making up the object. The area (FM7) includes the object perimeter and excludes any holes in the object.

The area (FM7) may be defined by the equation given below:

$$\text{Area} = \sum_{j=jmin}^{jmax} \sum_{i=imin}^{imax} \begin{cases} 0 & I(j, i) = \text{background} \\ 1 & I(j, i) \neq \text{background} \end{cases}$$

The elongation (FM8) features the percentage of elongation of an object. More particularly, the metric for an object's elongation is a measure of how stretched out or elongated an object is and is given as a number between 0 and 1 inclusive. If equal to 1, the object is a regular polygon. As the elongation decreased from 1, the object becomes more elongated.

elongation=minAxis/*maj*Axis

The roundness (FM9) feature is the percentage of roundness of an object based on a normal circular function. The metric for an object's roundness, or compactness, is given as a value between 0 and 1. This is computed as the ratio of object area to circumference as shown below. As roundness increases, so does the ratio. If the ratio is equal to 1, the object is a perfect circle. As the ration decreases from 1, the object departs from a circular form.

The roundness (FM9) features may be defined by the below expression:

roundness=$4\pi$Area/circum$^2$

The smoothness (FM10) feature is the amount of edge smoothness of an object and is based on an 8-connected edge finding technique, known in the art. Smoothness is a number between 0 and 1, where 0 is perfectly smooth and 1 is very jagged.

More particularly, a measure of the smoothness of the object perimeter is determined based on the direction changes between adjacent line segments. At each point (p)

in the object perimeter the direction of travel to the next perimeter point is compared with the direction of travel from the previous perimeter point. No change in direction receives 0 points. A change of one compass setting (for example, from North to Northeast) receives 1 point. A change of two compass settings (for example, from North to East) receives 2 points. A change of three compass settings (for example, from North to Southeast) receives 3 points. A complete reversal of direction (for example, from North to South) receives 4 points. Direction change is summed over the object perimeter and normalized to the range 0-1 by dividing by 4 times the number of perimeter points.

The partiality (FM11) feature determines whether an object is completely contained in the area of interest (AO1) or only partially contained. More particularly, if an object's perimeter is in contact with an edge of another object, partially feature (FM11) is set to true, otherwise if is set to false. Partial objects are not fully visible and metrics such as area only reflect the part of the object that is in the field of view.

The circumference (FM12) feature is the length in pixels of the object's boundary. More particularly, at each point (p) in an object's perimeter the distance to the next perimeter point is added to the circumference sum, wrapping to the first point when the last is reached. If the next point is horizontally or vertically adjacent, the distance from pixel center to pixel center is 1. If the next point is diagonally adjacent this distance is 1.414. The circumference (FM12) feature may be expressed as:

$$circum = \sum_p \begin{cases} 1 & \text{next pt horz or vert} \\ 1.414 & \text{next pt diagonal} \end{cases}$$

where p is a point in the object perimeter.

The perimeter count (FM13) feature is the number of pixels (points) making up an object's boundary. The perimeter count (FM13) feature differs from circumference feature (FM12) because the perimeter count (FM13) feature simply counts the pixels, not taking into account the orientation of neighboring pixels.

The perimeter count feature may be given by the below expression:

$$perim = \sum_p 1$$

where p is a point in the object perimeter.

In operation, by using these thirteen (13) minimum metrics (FM1)-(FM13), one can implement an Adaptive Morphological Feature Based Object Classifier 42 for any image object. Since each feature metric (FM1)-(FM13) has a system defined limit, it is possible to utilize the AMFBOC 42 to identify, track, label and detect an object(s) in an image or image sequence by the below steps 1-3:

Step #1: Capture objects in a image using CMIS 10 imaging system capable of capturing an image of an object(s).

Step #2: Implement AMFBOC 42 to identify "training" or "master" objects in an image or image sequence. Adjust and Adapt AMFBOC to object(s) classification specifications in a manner known in the art.

Step #3: Implement AMFBOC 42 on entire range of objects in order to label and identify acceptable (within master range) or unacceptable (out of master range) objects.

Figure 2:
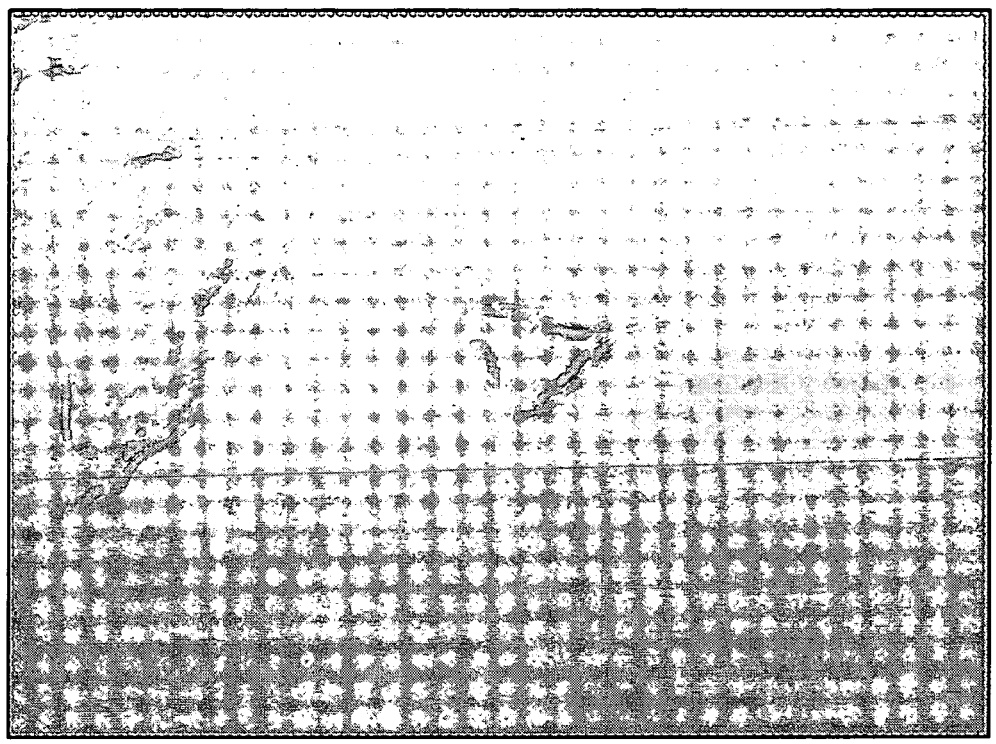
FIG. 2 illustrates a typical "training" cell employed by Adaptive Morphological Feature Based Object Classifier (AMFBOC) utilized by CMIS of the present invention.
Figure 3:
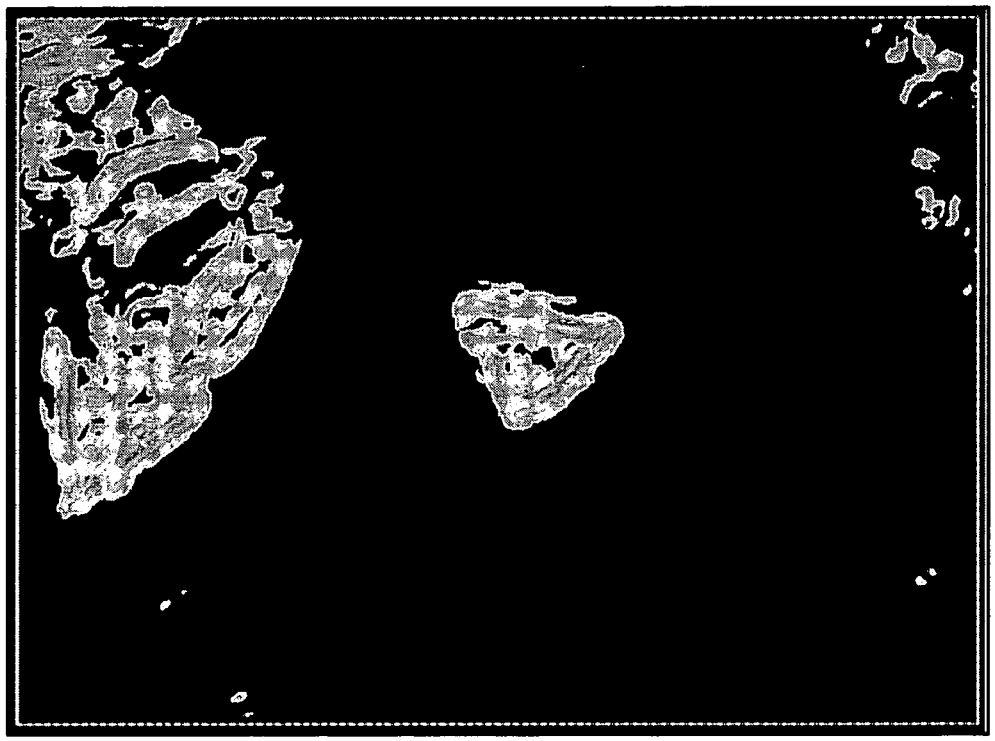
FIG. 3 illustrates the AMFBOC analysis of an image.

FIGS. 2 and 3 were yielded by the practice of this invention, wherein FIG. 2 illustrates a typical "training" cell employed by Adaptive Morphological Feature Based Object Classifier AMFBOC 42 utilized by CMIS 10 of the present invention and FIG. 3 illustrate the AMFBOC 42 analysis of an image.

Further still, in the practice of the present invention eleven (11) objects were identified and the results thereof are given in the below Table 1 wherein the objects are identified by the symbol #id. Table 1 shows the feature metrics from a typical training set with id #2 being the cell to train.

TABLE 1

| # id | X | y | area | Left | top | Right | bottom | circum | elong | major |
|---|---|---|---|---|---|---|---|---|---|---|
| 1 | 517.1 | 18.4 | 120 | 511 | 13 | 523 | 24 | 39.6 | 0.6 | 14.1 |
| 2 | 289.1 | 275 | 4937 | 220 | 235 | 351 | 306 | 355.6 | 0.5 | 124.4 |
| 3 | 297 | 241.2 | 32 | 291 | 236 | 304 | 243 | 33.6 | 0.2 | 12.9 |
| 4 | 84.3 | 310 | 21 | 81 | 309 | 88 | 311 | 16.2 | 0.5 | 5.1 |
| 5 | 388.6 | 313.5 | 27 | 385 | 311 | 392 | 316 | 19.3 | 0.6 | 7.6 |
| 6 | 227.1 | 330.5 | 170 | 221 | 322 | 234 | 338 | 51.5 | 0.7 | 17.4 |
| 7 | 602.8 | 369.2 | 23 | 600 | 367 | 605 | 372 | 15.9 | 0.8 | 5.5 |
| 8 | 594.5 | 373.8 | 65 | 590 | 368 | 600 | 378 | 33 | 0.5 | 12.9 |
| 9 | 90.9 | 401.1 | 212 | 75 | 387 | 105 | 414 | 96.9 | 0.2 | 39.5 |
| 10 | 151.8 | 451.2 | 106 | 145 | 446 | 160 | 457 | 44.6 | 0.6 | 16.2 |
| 11 | 158.9 | 463.5 | 118 | 152 | 457 | 165 | 470 | 45.5 | 0.5 | 16.8 |

| # id | minor | partl | Perim | theta | round | smooth | gMin | gMax | gAvg | gDev |
|---|---|---|---|---|---|---|---|---|---|---|
| 1 | 9.2 | F | 35 | 103.6 | 1 | 0.2 | 24 | 201 | 131.9 | 36.4 |
| 2 | 67.1 | F | 310 | 24.2 | 0.5 | 0.1 | 20 | 255 | 194.2 | 58.6 |
| 3 | 2.6 | F | 29 | 22 | 0.4 | 0.2 | 22 | 185 | 109.3 | 37.9 |
| 4 | 2.7 | F | 15 | 174.3 | 1 | 0.1 | 55 | 172 | 116.3 | 39.3 |
| 5 | 4.2 | F | 16 | 23.7 | 0.9 | 0.2 | 20 | 175 | 120 | 39.3 |
| 6 | 11.6 | F | 44 | 109.6 | 0.8 | 0.2 | 52 | 240 | 147.2 | 43.7 |
| 7 | 4.5 | F | 13 | 135 | 1.1 | 0.2 | 54 | 164 | 109.4 | 23 |
| 8 | 5.9 | F | 28 | 138.4 | 0.8 | 0.2 | 52 | 196 | 124.6 | 31 |
| 9 | 8.4 | F | 82 | 42.1 | 0.3 | 0.2 | 20 | 183 | 117.8 | 28 |
| 10 | 9.6 | F | 38 | 20.6 | 0.7 | 0.2 | 20 | 218 | 144.6 | 40.8 |
| 11 | 9 | F | 38 | 24.6 | 0.7 | 0.2 | 48 | 219 | 144 | 42.2 |

From Table 1, it should be noted that id #2 is a "training" object and not within the "master" range acceptable to the AMFBOC 42. A correlation of the nomenclature of Table 1 to the feature metric is given as follows: FM1, Bounding Box, equals the size from (top, right) to (bottom, left); FM2, Intensity-Weighted Center of Mass, equals the value (x, y); FM3, Intensity/Color Statistics, equals the values gMin, gMaxm gAvg, gDev; FM4, Major Axis Length, equals the value major; FM5, Minor Axis Length, equals the value minor; FM6, Major Axis Orientation (Theta), equals the value theta; FM7, Area, equals the value area; FM8, Elongation, equals the value elong; FM9, Roundness, equals the value round; FM10, Smoothness, equals the value smooth; FM11, Partiality, equals the value parti; FM12, Circumference, equals the value circum; and FM13, Perimeter count, equals the value perim.

The AMFBOC 42 operatively controls the robotics system 22, as well as diagnoses and provides image processing and pattern recognition related to the machine vision routines 38.

The AMFBOC 42 provides a vast improvement relative to a basic neural network approach which is to accept several inputs (N) and based on an error relationship produce a finite set of outputs (M). The difficulty in using basis neural networks is that the results can be unpredictable and the neural network may fail to yield an optimal solution if conditions suddenly change. However, when the AMFBOC 42 is implemented as for the present invention, the "best case" scenario is optimized by a set of learning behaviors built into the neural network. Just as humans adapt to a changing environment, so can an adaptive neural network. Such is the case in the practice of the present invention with regard to the technique of auto-focus, auto-image scanning and the detection of defects. Rather than have several inputs mapped to a finite set of outputs (M), an adaptive neural network takes several inputs (N) and maps them to a set of outputs (M+1), with the (+1) referring to a new case that can be optimized/defined in the future.

The practice of the present invention, in particular AMFBOC 42, uses inputs or features that a human would use to identify, detect and classify objects, cells and areas of interest. These are represented by the initial sets of images that are received. The practice of the invention utilizing AMFBOC 42 uses image processing techniques and creates a relational database of the features (FM1)-(FM13) identified by the humans. These features (FM1)-(FM13) serve as a baseline input feature set and are used to train/teach the AMFBOC 42. The practice of the invention develops a machine vision technique that is used to identify the input feature set, but also has the ability to learn how to adapt to various changing inputs to produce an optimal output. For example, let's take a group of cells that have 4 defects in each cell. A standard neural network technique, as well as the AMFBOC 42, will identify only cells with 4 defects. Now for example, take a group of cells with 7 defects in them. A standard neural network technique will output no cells identified or label all cells as having only 4 defects, which would be a gross misrepresentation of the data. However, the AMFBOC 42 techniques practiced by the present invention outputs cells with 4, 5, 6, or 7 defects since it has the ability to reason or adapt to the changing number of defects. One of the machine vision routines is related to interface detection of colloidal hard spheres systems.

Microscopic hard spheres in a colloid suspension have been used for studying atomic phase changes from disorder to order or from liquid to solid. It is my understanding that current microscope image analysis techniques are not able to distinguish between these densely packed phases within microscope images, which have similar grayscale value properties and are mainly characterized by degrees of randomness or order. The current technique for identifying the phased change boundaries involves manually identifying the transitions, which is very time consuming and inefficient. The present invention provides a method that overcomes these difficulties. More particularly, the present invention provides a technique that accurately detects the interface of colloidal hard spheres experiments automatically and without human intervention and may be further described with reference to FIG. 4.

Figure 4:
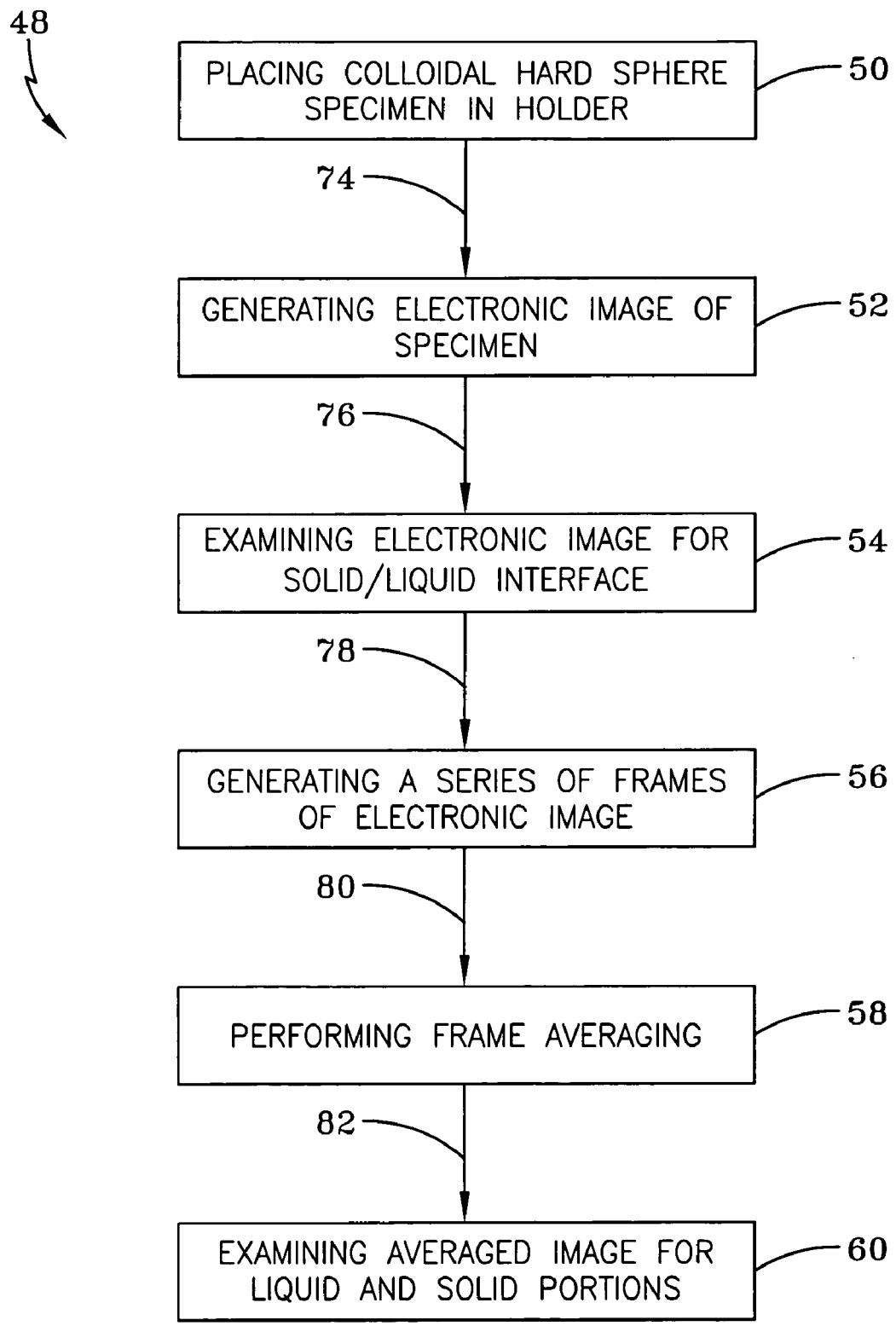
FIG. 4 is a flow chart of one embodiment of the present invention.

FIG. 4 illustrates an overall flow chart for a routine 48 for interface detection of colloidal hard spheres. The routine 48 is comprised of steps represented by segments 50, 52, 54, 56, 58, and 60 shown in FIG. 4, some of which serve as program segments.

Figure 6:
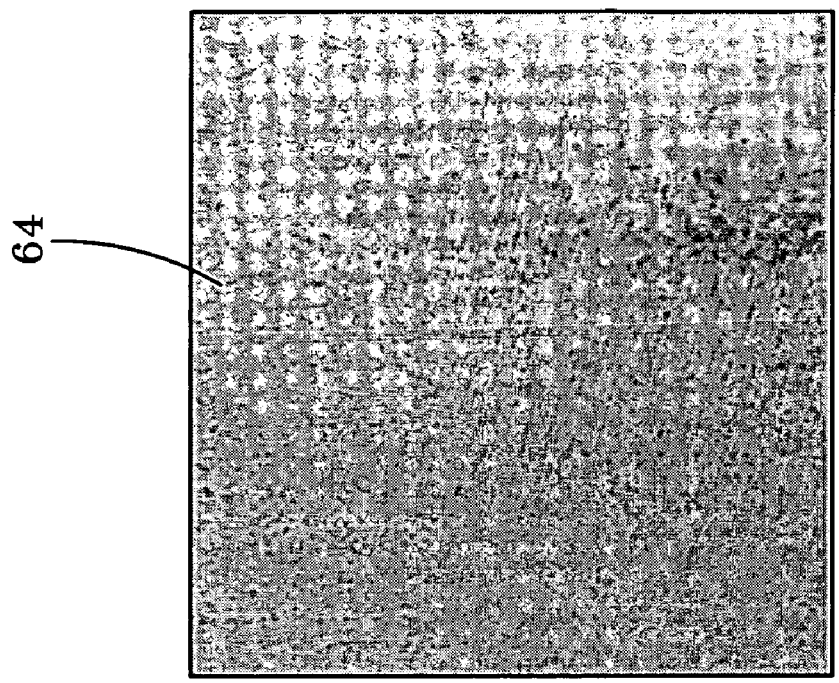
FIG. 6 illustrates a colloid image related to the embodiment of FIG. 4 and shows vertical growth.

In general, a colloid system, examined by the practice of the present invention, consists of two phases, a solid or ordered phase and a liquid or disordered phase. There is a quasi-zone in between these two phases, which has to be analyzed in order to determine an accurate interface. Depending on the orientation of the sample, the practice of the present invention provides an interface technique to analyze the following two cases: (1) horizontal crystal growth from left to right as shown in FIG. 5, and (2) vertical crystal growth from bottom to top as shown in FIG. 6.

Figure 5:
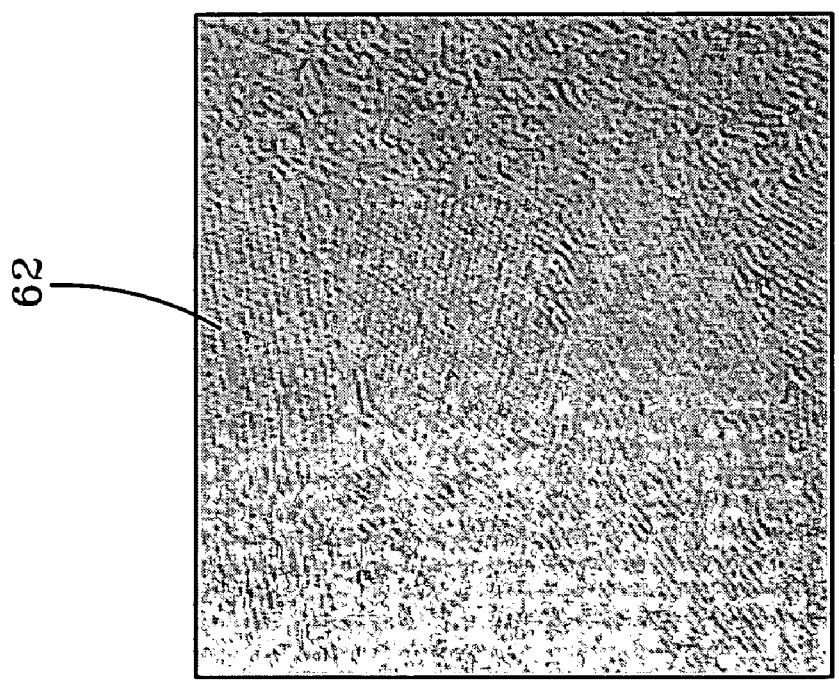
FIG. 5 illustrates a colloid image related to the embodiment of FIG. 4 and shows horizontal growth.

If the solid/liquid interface is oriented horizontally (the crystal is growing across the screen), the rightmost portion of this object contains the contour of the solid/liquid interface generally identified by reference number 62 of FIG. 5. If the solid/liquid interface is oriented vertically (the crystal is growing up the screen), the top portion of this object contains the contour of the solid/liquid interface generally identified by reference number 64 of FIG. 5.

Based on kinetic theory, it is that matter is made of molecules in continual random motion. In a crystalline or solid state, these molecules are held in place by attractive forces and tend to vibrate around a fixed position. In a liquid state, the molecules have a greater range of motion. With this concept in mind, it is expected that the molecules in the liquid portion of the system exhibit a higher degree of motion than those in the solid. This higher degree expectation allows the present invention to use frame averaging to visually separate solid from liquid regions.

Figure 8:
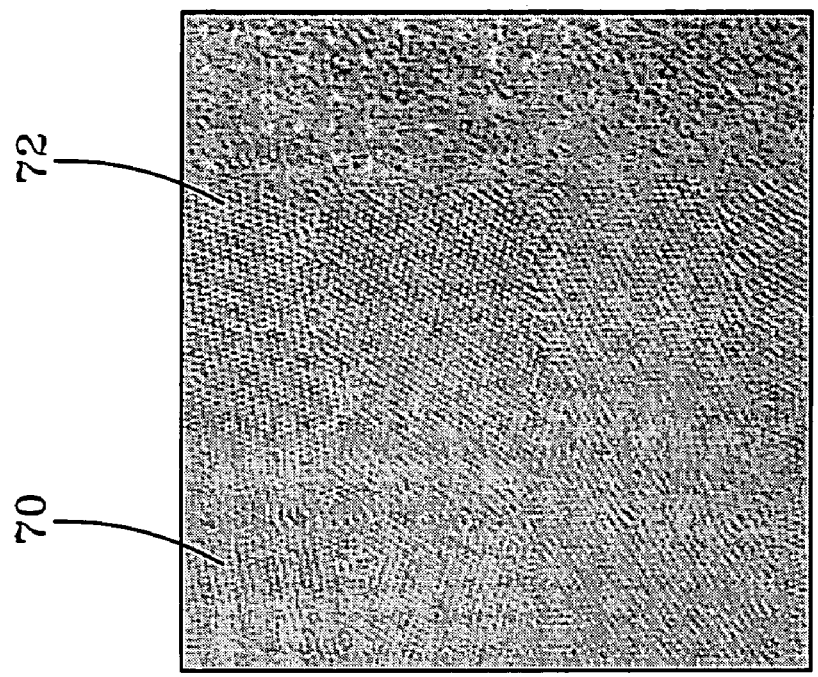
FIG. 8 is a typical frame averaged image.
Figure 7:
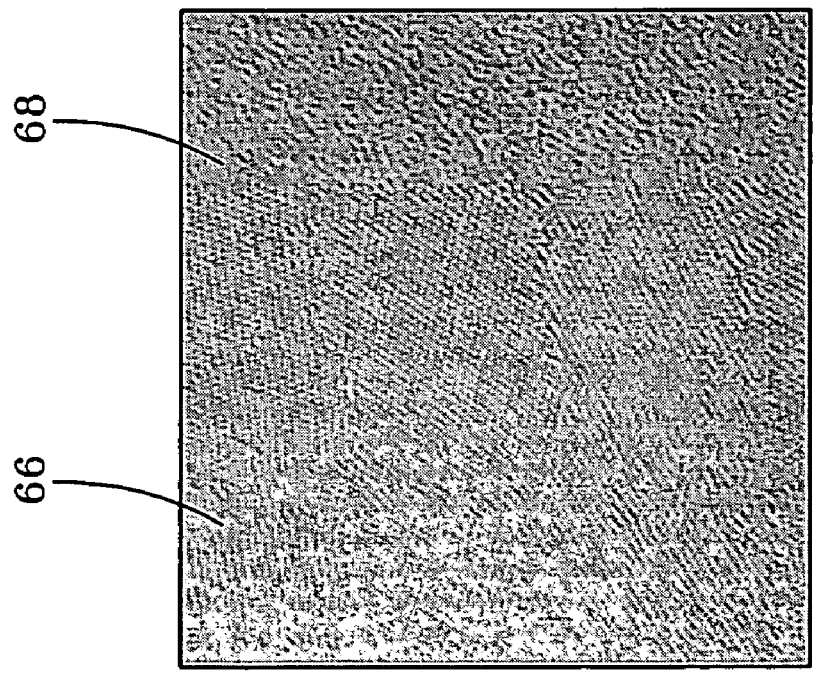
FIG. 7 illustrates a typical colloid image.

The method of FIG. 4 averages a series of frames performed by one of algorithms 40 by summing each individual pixel over each frame in the series and dividing by the number of frames. In a colloidal suspension, the spheres in the "liquid" region have more freedom of movement than the spheres in the solid region. When multiple frames are averaged, the liquid region tends to become blurry or grayed out while the solid region maintains a higher level of contrast and may be represented by the below expression:

$$O_{ij} = \sum_n I_{ij} I_n,$$

i,j: row and column position of the pixel in a frame (image)
n: number of frames
I: input pixel,
O: output pixel FIGS. 7 and 8 give examples of a typical image and the averaged image over a series of frames, wherein the liquid and solid portions of FIG. 7 are respectively generally identified by reference numbers 66 and 68 and wherein the liquid and solid portions of FIG. 8 are respectively generally identified by reference numbers 70 and 72. Note the loss of contrast in the liquid portion of the averaged image of FIG. 8. The overall operation of the method of interface detection of colloid hard surfaces may be further described with again reference to FIG. 4.

As seen in FIG. 4, the method for interface detection of colloidal hard sphere is initiated by segment 50, which signifies the placing of the colloidal hard sphere specimen, having a solid/liquid interface to be examined, in the holder 14. Upon such placement, the method of FIG. 4 passes control to program segment 52, by way of signal path 74.

The program segment 52 causes the video microscope 12 to generate an electronic image, serving as a frame of the colloidal specimen. Upon such generation by program segment 52, control is passed to program segment 54, by way of signal path 76.

The program segment 54 examines the frame of the electronic image to determine if the solid/liquid interface has a horizontal or vertical growth previously discussed. Upon completion, program segment 54 passes control to program segment 56, by way of signal path 78.

The program segment 56 generates a series of frames of electronic images of the examined specimen and then passes control to program segment 58, by way of signal path 80.

The program segment 58 performs averaging of the series of frames to provide an imaged averaged over the series of frames so as to separate the solid/liquid portions of the electronic image. Upon completion, program segment 58 passes control to program segment 60, via signal path 82.

The program segment 60 examines, by displaying on terminal 44, the averaged image to identify the liquid portions by blurred or grayed out regions of the averaged image and to identify the solid portions as clear regions with contrast therein.

Figure 9A:
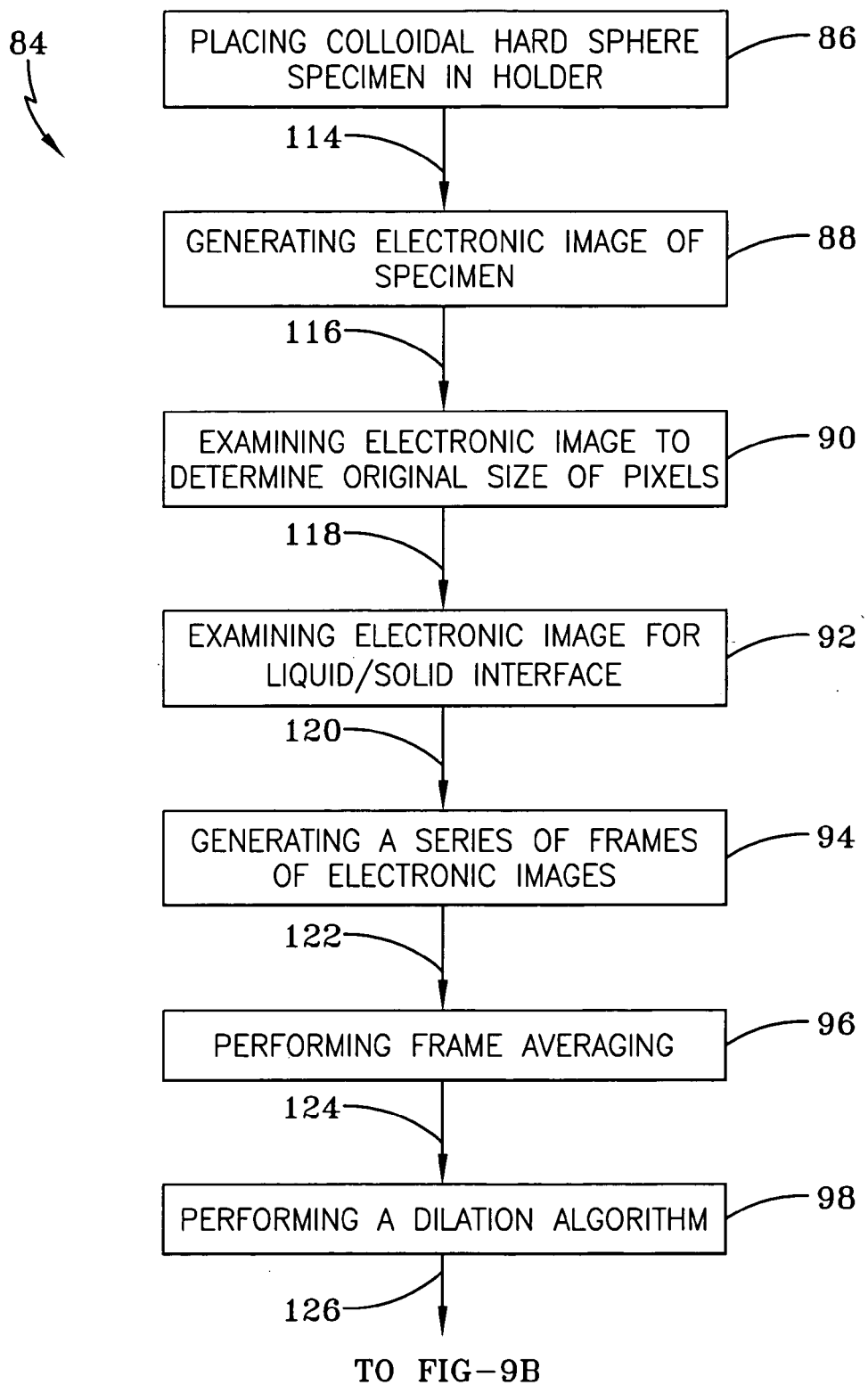
FIG. 9 is composed of FIGS. 9A and 9B, which cumulatively illustrate a flow chart for another method of the present invention.
Figure 9B:
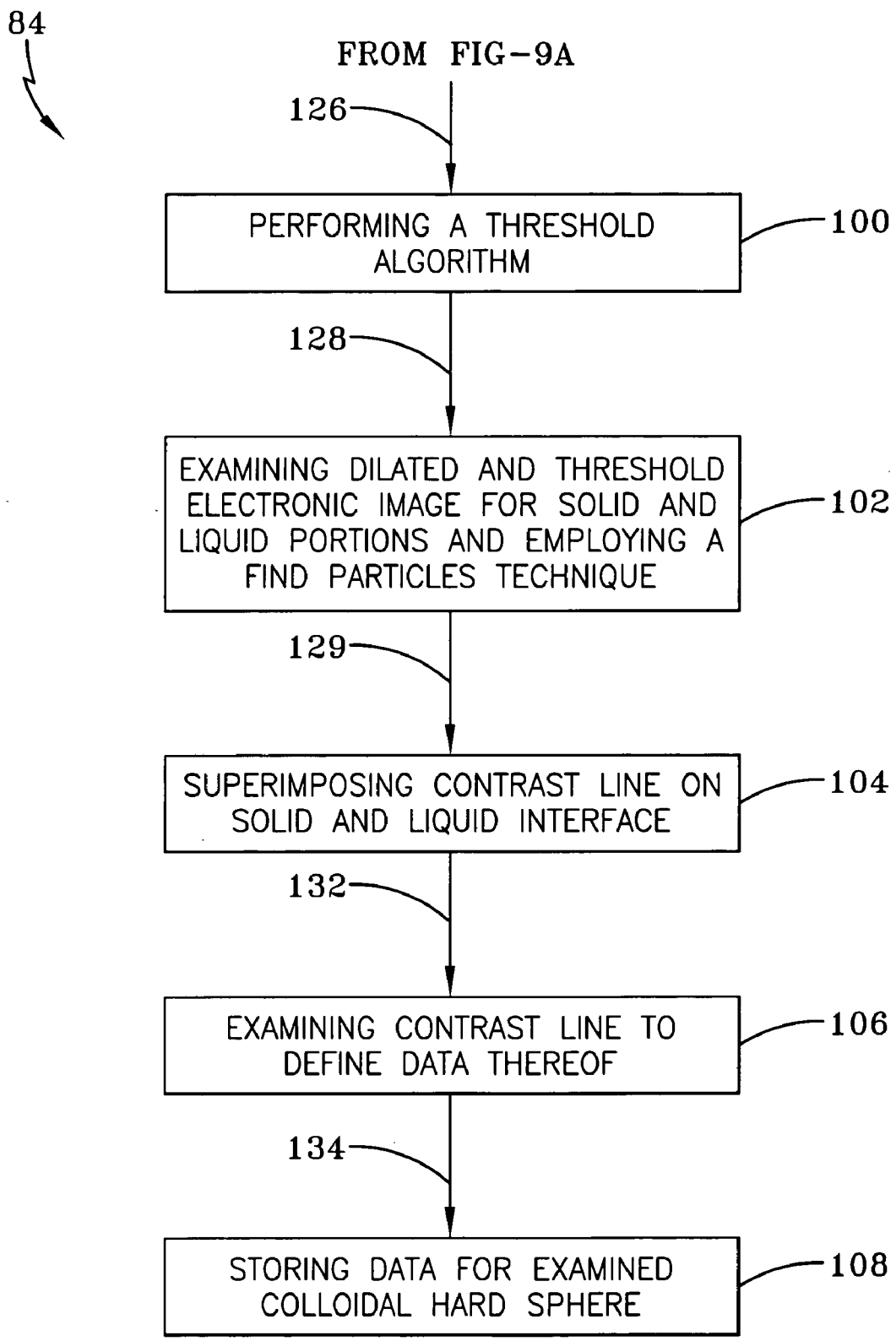
Figure 11:
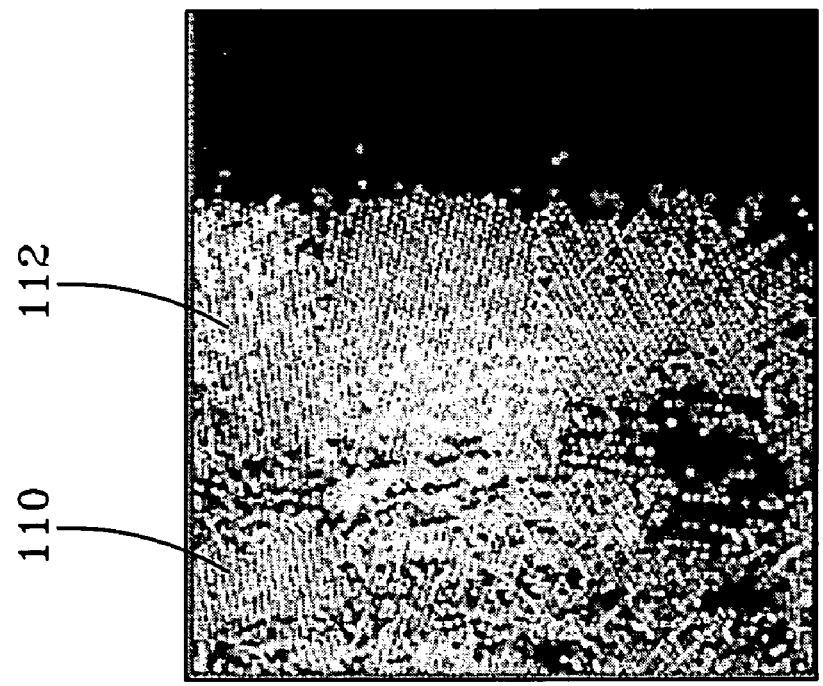
FIG. 11 illustrates an image of a dilation treated image combined with optimal threshold related to the embodiment of FIG. 9.

Another embodiment for providing a routine for interface detection of colloidal hard surfaces, may be further described with reference to FIG. 9, which is composed of FIGS. 9A and 9B, wherein FIG. 9A illustrates the overall method 84 comprised of elements 86, 88, 90, 92, 94, 96, and 98, and wherein FIG. 9B illustrates the overall method 84 as further comprising elements 100, 102, 104, 106, and 108. The program 84 of FIG. 9 is different than the program 48 of FIG. 4 in that it provides for a brightness slicing technique.

Figure 10:
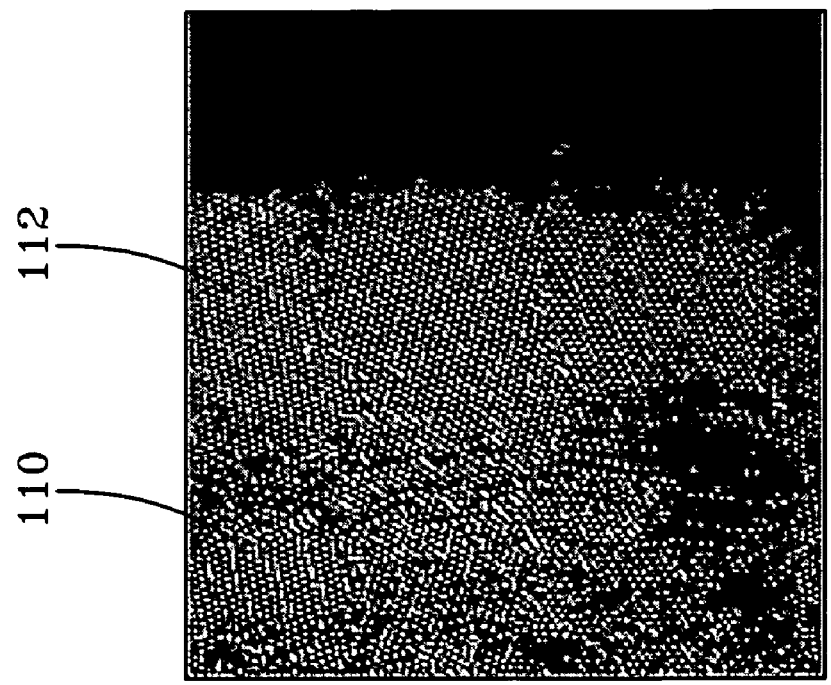
FIG. 10 illustrates the result of brightness slicing on a frame-average image related to the embodiment of FIG. 9.

The brightness slicing technique is used to create a very high-contrast image that specifically highlights a particular object of interest and works well in separating objects that have either light or dark values from a background with intermediate values. In the averaged image shown in FIG. 8, previously discussed, the ordered or solid portion of the image is made up of light and dark values, while the disordered or liquid portion of the image has intermediate gray values. As will be further described, the brightness slicing technique is performed on a series of frame-averaged images and when applied, the result will be a solid region highlighted in white against a black background, thereby making it quite easily to determine the solid-liquid interface. FIG. 10, to be further described illustrates a typical colloid image utilizing the brightness slicing technique. It should be noticed how there is now a distinct separation pattern from the solid and liquid regions of the image respectively generally identified by reference numbers 110 and 112.

Brightness slicing employed by the method of FIG. 9 is a double binary contrast enhancement operation, serving as another algorithm 40, where pixel brightness's below a lower threshold and above an upper threshold are set to white, while brightness's between the two thresholds are set to black. This results in the liquid or blurry region being set to black while the solid region is set to white and may be represented by the below expression:

$$O_{ij}=0, a_1 \leq I_{ij} \leq a_2$$

=1, otherwise $a_1$: lower threshold value.

$a_2$: upper threshold value.

The values of the quantities $a_1$ and $a_2$ are dependent upon the experiment being conducted and more importantly, a light or a dark background. The range of the quantities, $a_1$ and $a_2$, can be between O (black) and 255 (white). The brightness slicing technique may be further described with again reference to FIG. 9.

As seen in FIG. 9A, the overall routine 84 for interface detection of colloidal hard surfaces employing the brightness slicing technique is initiated by segment 86 which signifies the placing of colloidal hard sphere specimen in holder 14. Upon such completion, the method 84 passes control to program segment 88, by way of signal path 114.

Program segment 88 causes the video microscope 12 to generate an electronic image, serving as a frame, of the colloid specimen and then passes control to program segment 90, via signal path 116.

Program segment 90 examines the electronic image to determine the original size of the pixel representing articles of the colloid specimen. Original size determination is utilized by program segment 98 to be further described hereinafter. Upon completion, program segment 90 passes control to program segment 92, by way of signal path 118.

Program segment 92 examines the electronic image and determines solid/liquid interface as manifesting a horizontal or vertical crystal growth. Upon completion, program segment 92 passes control to program segment 94, by way of signal path 120.

Program segment 94 generates a series of frames of the electronic image. Upon completion, program segment 94 passes control to program segment 96, by way of signal path 122.

Program segment 96 performs averaging of the frames to provide an image average over the series of frames so as to visually separate the solid and liquid portions of the electronic image. Upon completion, program segment 96 passes control to program segment 98, by way of signal path 124.

Program segment 96 takes into account the fact that due to the solid region containing some of the same intensity values as the liquid regions, some erosion of the particle may occur. Program segment 98 compensates for the erosion by dilating the particles to approximate the original size.

After the brightness slice operation performed by program segments 88, 90, 92 and 94, the solid portion of the region is made up of many individual white pixels. A Find Particles algorithm, part of the algorithms 40, to be further described hereinafter, will only find particles that are 8-connected. A perfectly 8-connected object has a continuous perimeter that can be traced by traveling in 8 directions (up, down, left, right, and diagonals) and at least one pixel separating the object from the image edge. For the method of FIG. 9, it is desired to dilate the white pixels to ensure that they will form a connected mass. In one practice of the present invention, the best dilation technique was a 7×7 low pass filter with 0 at the center and larger weights away from the center as shown in Table 2.

TABLE 2

| 1/64 | 1/32 | 1/16 | 1/8 | 1/16 | 1/32 | 1/64 |
|------|------|------|-----|------|------|------|
| 1/32 | 1/16 | 1/8  | 1/4 | 1/8  | 1/16 | 1/32 |
| 1/16 | 1/8  | 1/4  | 1/2 | 1/4  | 1/8  | 1/16 |
| 1/8  | 1/4  | 1/2  | 0   | 1/2  | 1/4  | 1/8  |
| 1/16 | 1/8  | 1/4  | 1/2 | 1/4  | 1/8  | 1/16 |
| 1/32 | 1/16 | 1/8  | 1/4 | 1/8  | 1/16 | 1/32 |
| 1/64 | 1/32 | 1/16 | 1/8 | 1/16 | 1/32 | 1/64 |

The dilation produces a thin strip along the border of the image that is blacked out to ensure the solid region is separated from the image edge.

With reference to Table 2, it is seen the dilation produces a square matrix of weights of size m (in this case 7). This weighting is applied to the neighborhood of the current pixel (the current pixel is centered) and is given as follows:

$$\begin{matrix} w_{11} & w_{12} & \cdots & w_{1m} \\ w_{21} & w_{22} & \cdots & \\ \vdots & & \ddots & \vdots \\ w_{m1} & & \cdots & w_{mm} \end{matrix}$$

Upon completion, program segment 98 passes control to program segment 100, shown in FIG. 9B, via signal path 126.

Program segment 100 performs a threshold algorithm previously discussed with reference to brightness slicing. Upon completion, program segment 100 passes control to program segment 102, by way of signal path 128.

Program segment 102 receives the dilated threshold treated electronic image of program segment 100. Program segment 102 then examines and displays the dilated threshold treated electronic image to visually identify solid and liquid portions, each manifesting a separate pattern and preferably also employs a fine particle technique that scans the image and identifies every non-background object.

The find particle technique, serving as one of the algorithms 40, searches a grayscale image for non-background particles using an eight directional search (N, NE, E, SE, S, SW, W, NW) known in the art. The centroid of each particle is found using an intensity weighted center of mass algorithm also known in the art and part of the algorithms 40.

Figure 12:
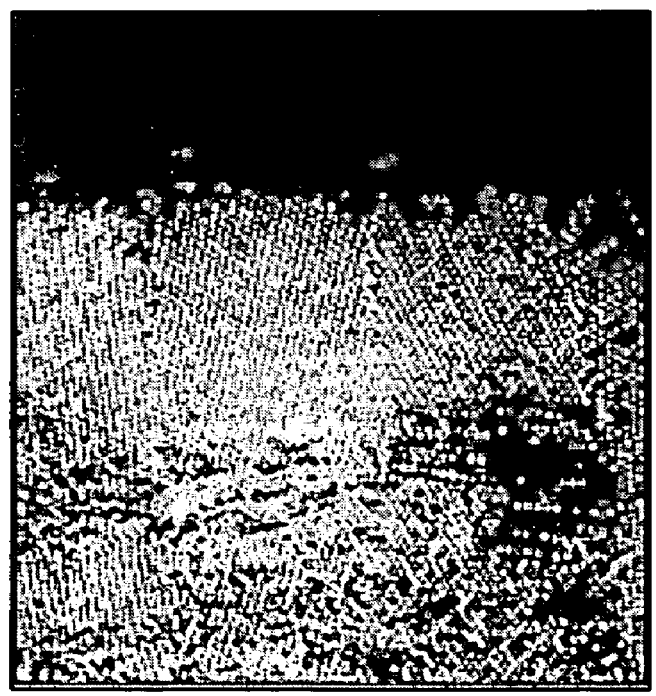
FIG. 12 is an image treated with a find particle algorithm related to the embodiment of FIG. 9.

The program segment 102 provides the examined dilated and threshold treated electronic image, and displays such on the display terminal 44 as represented by the image shown in FIG. 12. The image of FIG. 12 may be further enhanced by performance of program segments 104 and 106. Upon completion, program segment 102 passes control to program segment 104, by way of signal path 129.

Figure 13:
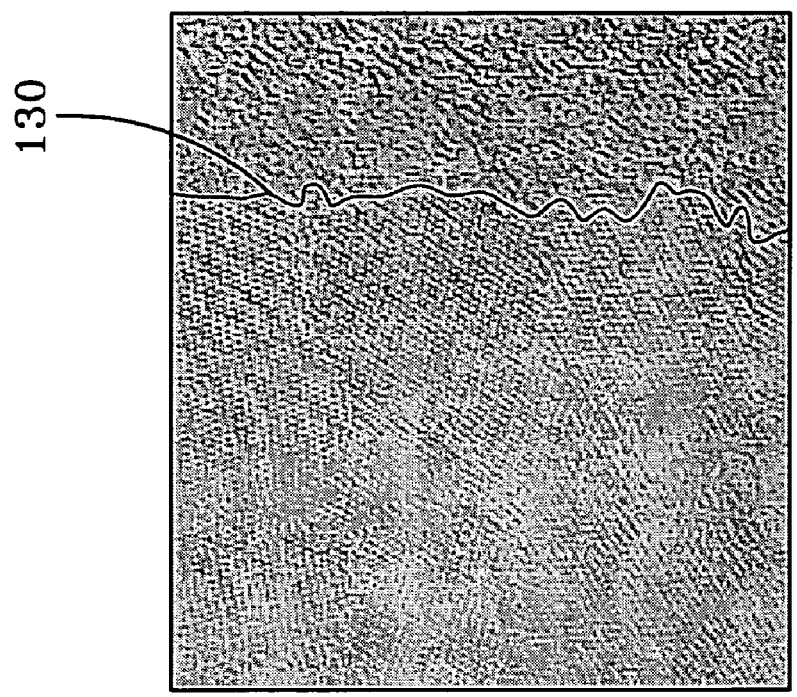
FIG. 13 is an image illustrating the interface analysis associated with the embodiment of FIG. 9.

Program segment 104 superimposes a contrast line 130 on the interface shape as shown in FIG. 13. To determine the interface 130, the largest particle found is determined to be the solid region. Depending on the previously specified orientation (horizontal or vertical growth) the topmost pixel in each column or the rightmost pixel in each row is taken as the solid/liquid interface. Upon completion, program segment 104 passes control to program segment 106, by way of signal path 132.

Program segment 106 examines the contrast line to define data thereof. Upon completion, program segment 106 passes control, via signal path 134 to program segment 108.

Program segment 108 stores the data in computer 28, in particular the database for the examined colloidal hard shape sphere residing in the holder 14.

Figure 15:
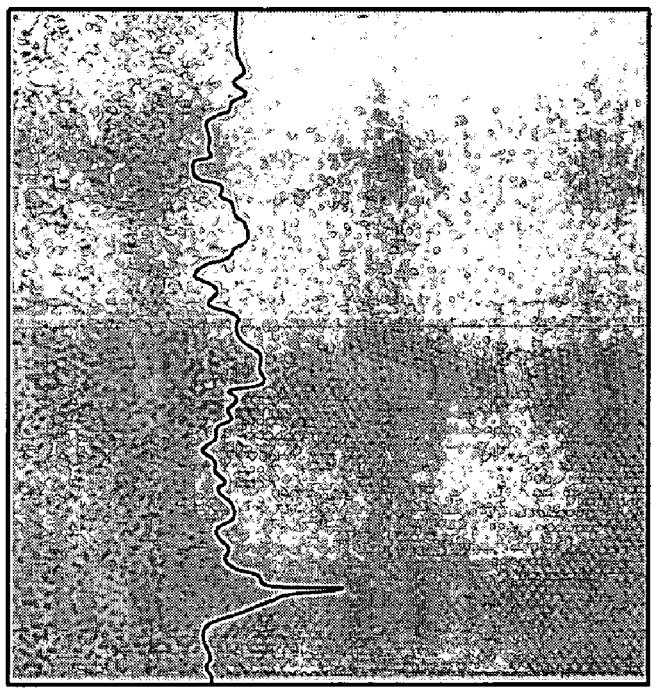
FIG. 15 illustrates the image showing the interface analysis related to vertical growth associated with the embodiment of FIG. 9.
Figure 14:
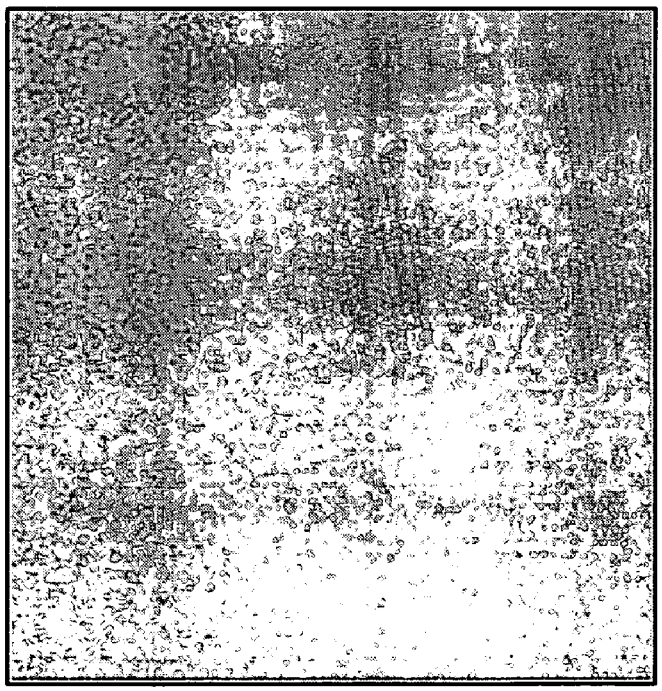
FIG. 14 illustrates a typical colloid image showing related to vertical growth associated with the embodiment of FIG. 9.

FIGS. 10, 11, 12 and 13 represent the images associated with the horizontal growth for the interface detection technique employing brightness slicing. This interface detection technique employing brightness slicing is also applicable to the vertical growth case and is shown in FIGS. 14 and 15.

It should now be appreciated that the present invention provides two related techniques for the detection of the interface of the colloid hard sphere experiments. Because of the practice of the present invention, experiments that used to take weeks or even months to analyze manually can now be accomplished in a manner of minutes or hours for a longer experiment.

Figure 16A:
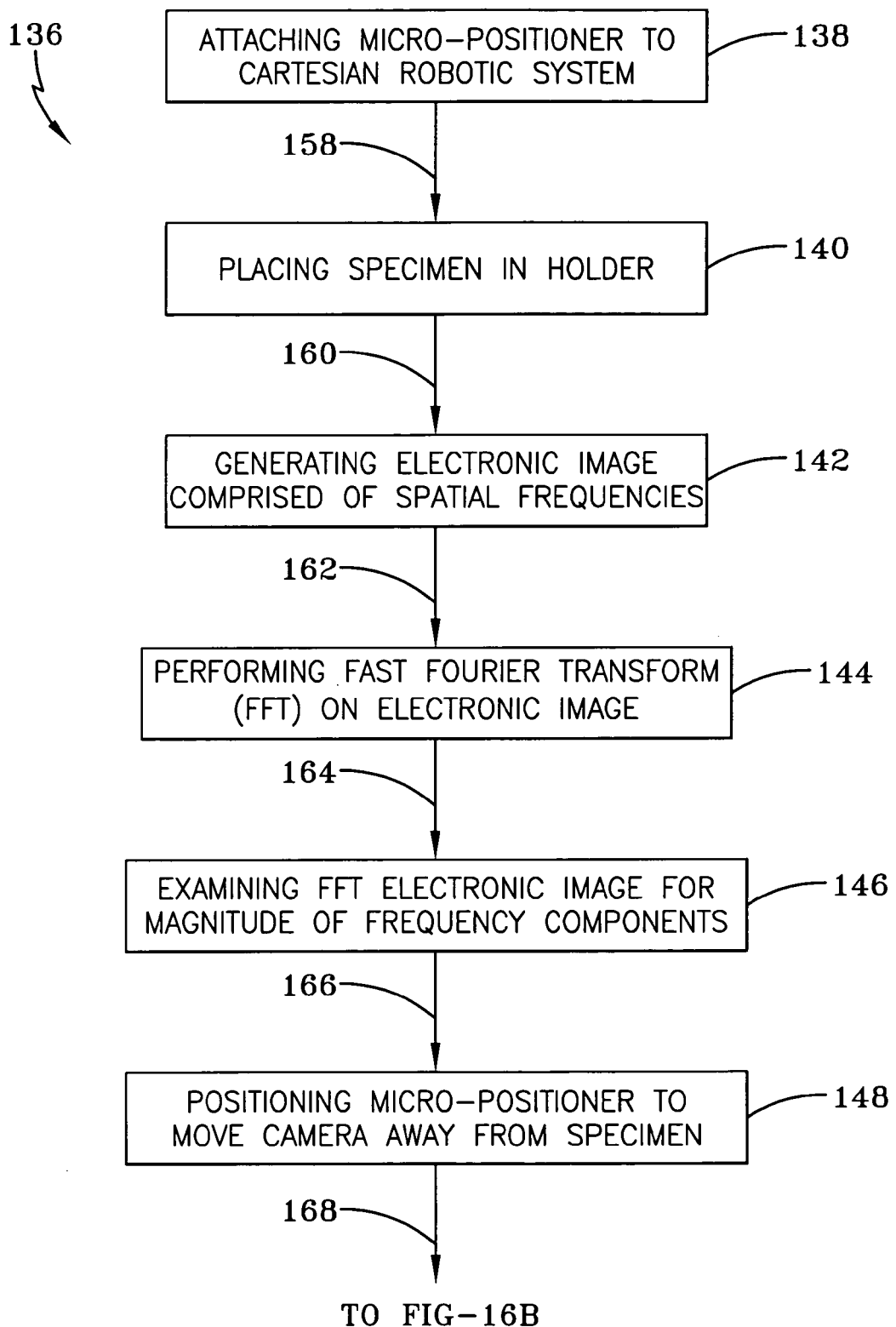
FIG. 16 is composed of FIGS. 16A and 16B that cumulatively illustrate a flow chart related to a further method of the present invention.
Figure 16B:
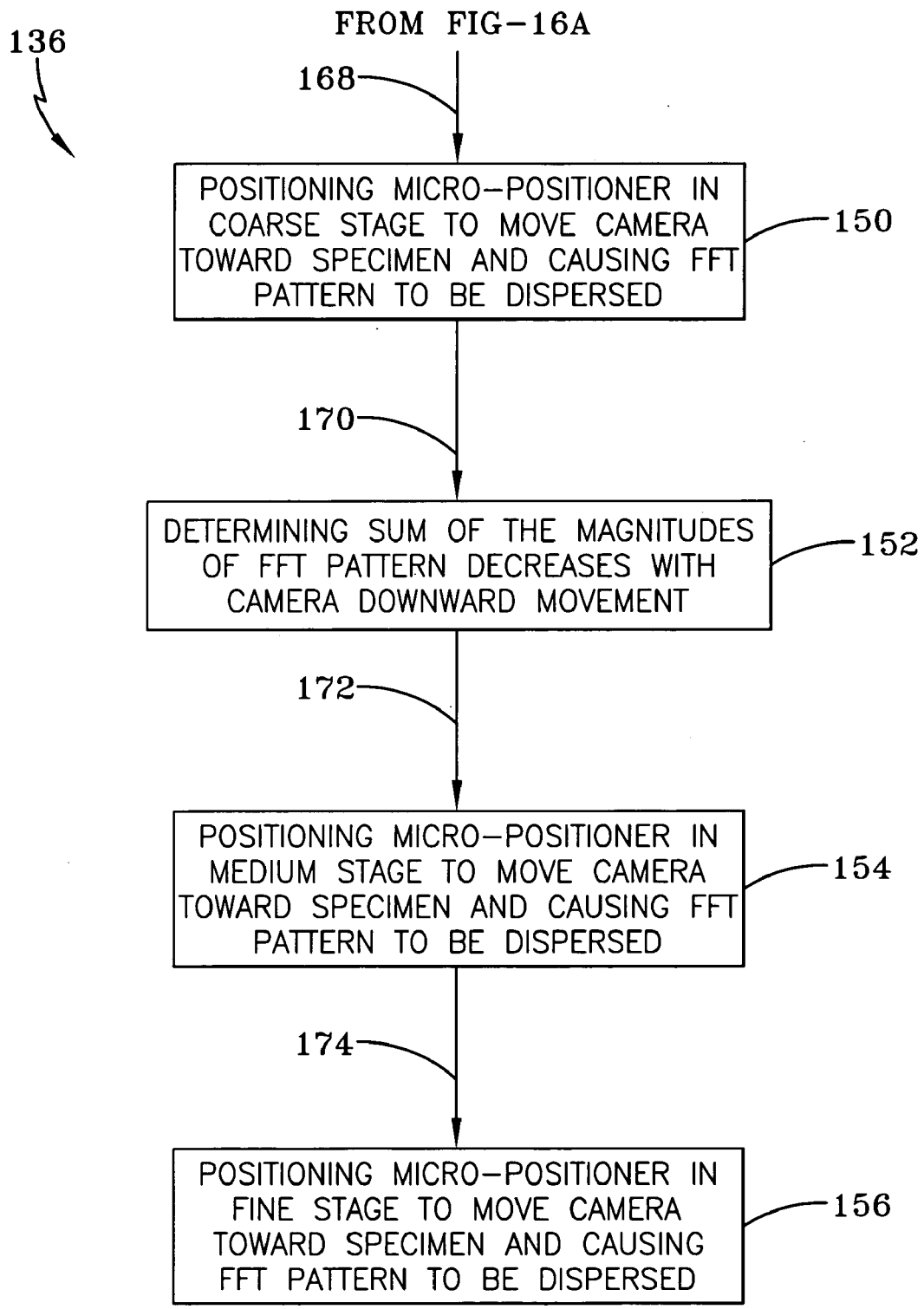

Another method of the present invention related to automatically focusing on a specimen may be further described with reference to FIG. 16 composed of FIGS. 16A and 16B, each showing portions of the overall method 136. More particularly, FIG. 16A shows the overall method 136 for automatically focusing on a specimen as comprised of elements 138, 140, 142, 144, 146, and 148. Similarly, FIG. 16B shows the overall method 136 for automatically focusing on a specimen as further comprised of elements 150, 152, 154, and 156.

As seen in FIG. 16A the routine 136 for automatically focusing on a specimen starts off with attaching a micro-positioner 22A, shown in FIG. 1, to a Cartesian robotic system 22. The micro-positioner 22A preferably has three stages: coarse; medium; and fine. The micro-positioner 22A has a vertical level having a top limit which causes the camera of the video microscope 12 to be situated by predetermined distance, which is the furthest distance possible from the target that is, the specimen that is held in holder 14. This predetermined distance depends on the type of robotic system being used. It can be as small as a millimeter and as long as a few feet. The practice of the invention used a system with a maximum distance of 1 foot and a system with a maximum distance of 2 inches and both worked well. The micro-positioner 22A, preferably has ten separate steps for each stage and the step size for the coarse stage is about 10 mm. Upon completion of segment 138, the method of FIG. 16 passes control to segment 138, via signal path 158.

Segment 140 signifies that the specimen to be examined is placed in a holder and then segment 140 passes control to program segment 142, by way of signal path 160.

Program segment 142 causes the video microscope 12 to generate an electronic image comprises spatial frequencies, wherein any spatial frequency represents the rate of brightness transition.

Images generated by the video microscope 12 are made up of spatial frequencies. A spatial frequency is the rate of brightness transition (the rate at which spatial details cycle from light to dark and back to light). The Fast Fourier Transform is one method used to decompose an image into its fundamental frequency components. There is a magnitude and a phase value associated with each frequency component. For each image, a focus value is computed by taking the Fast Fourier Transform (FFT) of the largest possible portion of the center of the image. After the FFT operation, the image moves from the spatial domain to the frequency (or Fourier) domain. When an image is displayed in the frequency domain, the magnitudes of the frequency components that make up the image are also displayed.

For each pixel in the original image, there is one value displayed in the frequency transform image. The display of the magnitudes in the frequency domain is arranged symmetrically around the center of the image, with horizontal frequencies on the horizontal axis, vertical frequencies on the vertical axis, and diagonal frequencies off the axes. The zero-frequency point of the display is in the center. Frequencies increase outward from the center of the image to the maximum rate at the outermost point. The magnitude of each frequency component is indicated by the darkness of the pixel at each location in the image: the darker the pixel, the greater the magnitude of the corresponding spatial frequency.

Upon completion, program segment 142 passes control to program segment 144, by way of signal path 162.

Program segment 144 performs a Fast Fourier Transform on the electronic image so as to decompose the electronic image into its fundamental components with each component having magnitude and phase qualities. The FFT performance transforms the electronic image from a spatial domain to a frequency domain. Upon completion, program segment 144 passes control to program segment 146, by way of signal path 164.

Figure 18:
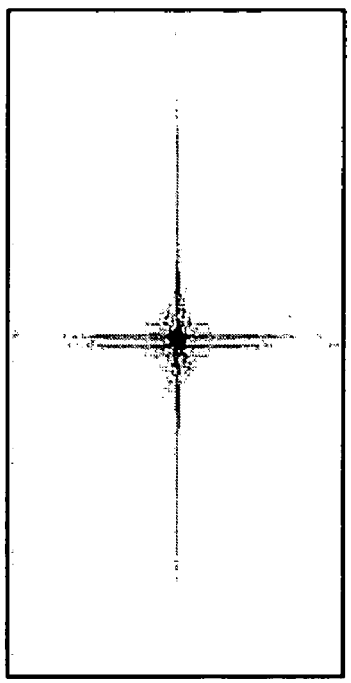
FIG. 18 illustrates Fast Fourier Transform (FFT) of an out-of-focus image related to the method of FIG. 16.
Figure 17:
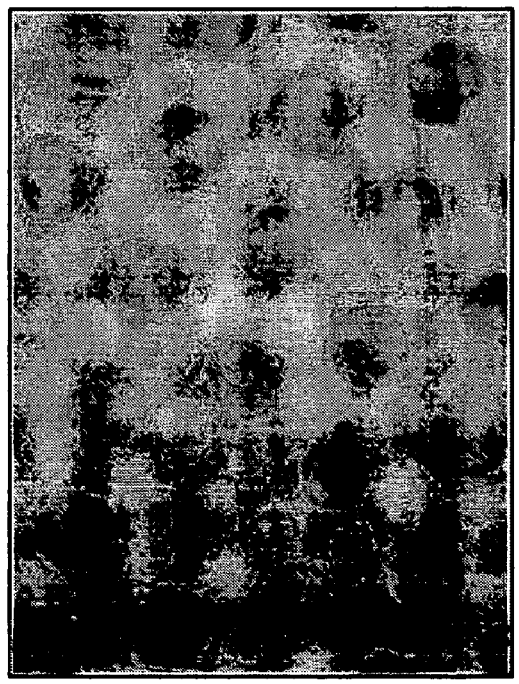
FIG. 17 illustrates an out-of-focus image related to the method of FIG. 16.
Figure 19:
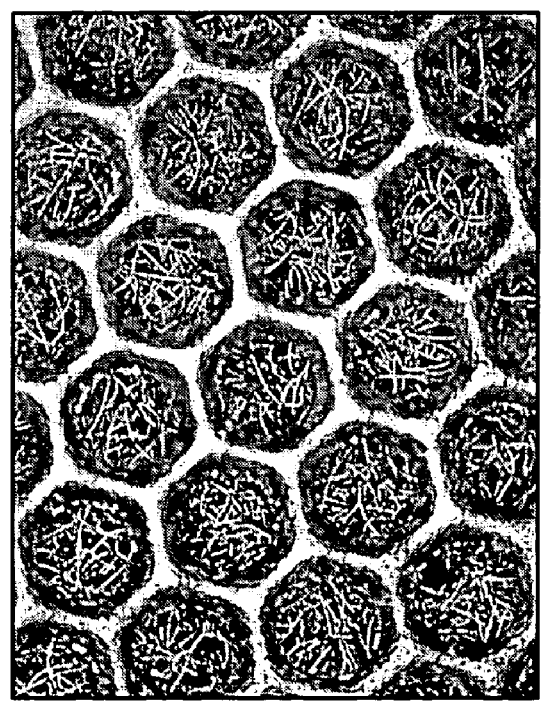
FIG. 19 illustrates an in-focus image related to the method of FIG. 16.

Program segment 146 examines the FFT electronic images by displaying the magnitude of the frequency components. A blurry, poorly focused image (see FIG. 17) is made up of low frequencies positioned near the center of the FFT. This results in a compact FFT pattern, with dark pixels near the center and a lot of white area (see FIG. 18). A correctly focused image of the same scene (see FIG. 19) will contain higher frequencies, resulting in a dispersed FFT pattern, with dark pixels spread over a wider area and less white background (see FIG. 20). Upon completion, program segment 146 passes control to program segment 148, by way of signal path 166.

Program segment 148 positions the vertical position of a micro-positioner 22A to its top level so that the camera is located away from the specimen by its first predetermined distance which is also the maximum distance in which the camera can be positioned away from the specimen. Upon completion, program segment 148 passes control, via signal path 168, to program segment 150 shown on FIG. 16B.

Figure 20:
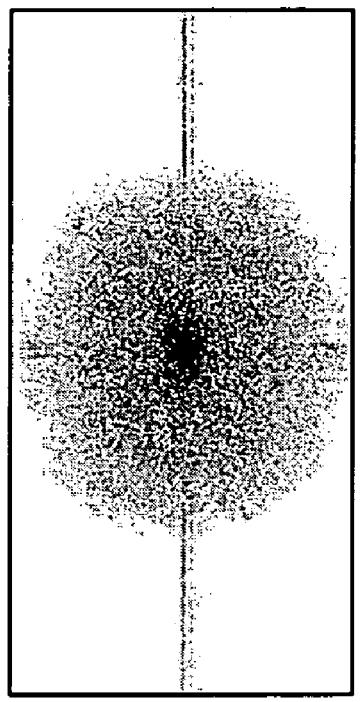
FIG. 20 illustrates a FFT of an in-focus image related to the method of FIG. 16.

Program segment 150 positions by separate steps, preferably 10, the micro-positioner 22A so that the camera moves downward and toward the specimen and a predetermined number of step sizes, preferably 10 mm, associated with the coarse stage of the micro-positioner, while at the same time examining that the FFT pattern being displayed becomes further dispersed, in a manner as shown in FIG. 20, as the camera moves downward by each of the coarse steps. Upon completion, program segment 150 passes control to program segment 152, by way of signal path 170.

Program segment 152 determines the sum of a magnitude of the FFT pattern while at the same time determining that the sum of the magnitude of the FFT pattern decreases as the camera moves downward at each coarse step. The magnitude over the FFT are summed for each image as the image becomes more focussed. The position where the focus value is at lowest is considered to be most in-focus. It is preferred that the step size of 10 mm be decreased by a factor of 10 and that program segments 150 and 152 be repeated. During such adjustments, the micro-positioner 22A moves such that the current-in-focus positioner is centered in a new range. Upon completion, program segment 152 passes control to program segment 154, by way of signal path 172.

Program segment 154 repeats program segments 150 and 152, but sets the micro-positioner 22A to its medium stage before such repeating. Upon completion, program segment 154 passes control to program segment 156, by way of signal path 174.

Program segment 156 repeats program segments 150 and 152, but now sets the micro-positioner 22A to its fine stage before such repeating is performed.

Upon completion of program segment 156, the method 136 produces an image that is ideally focussed to its maximum contrast.

The positioning of the micro-positioner 22A may be accomplished by a neural network routine appropriately programmed so that it sets its associated elements in a random manner and, based upon operational feedback these elements are molded into the pattern required to provide the required results, that is, an ideally focused image with maximum contrast.

Figure 21A:
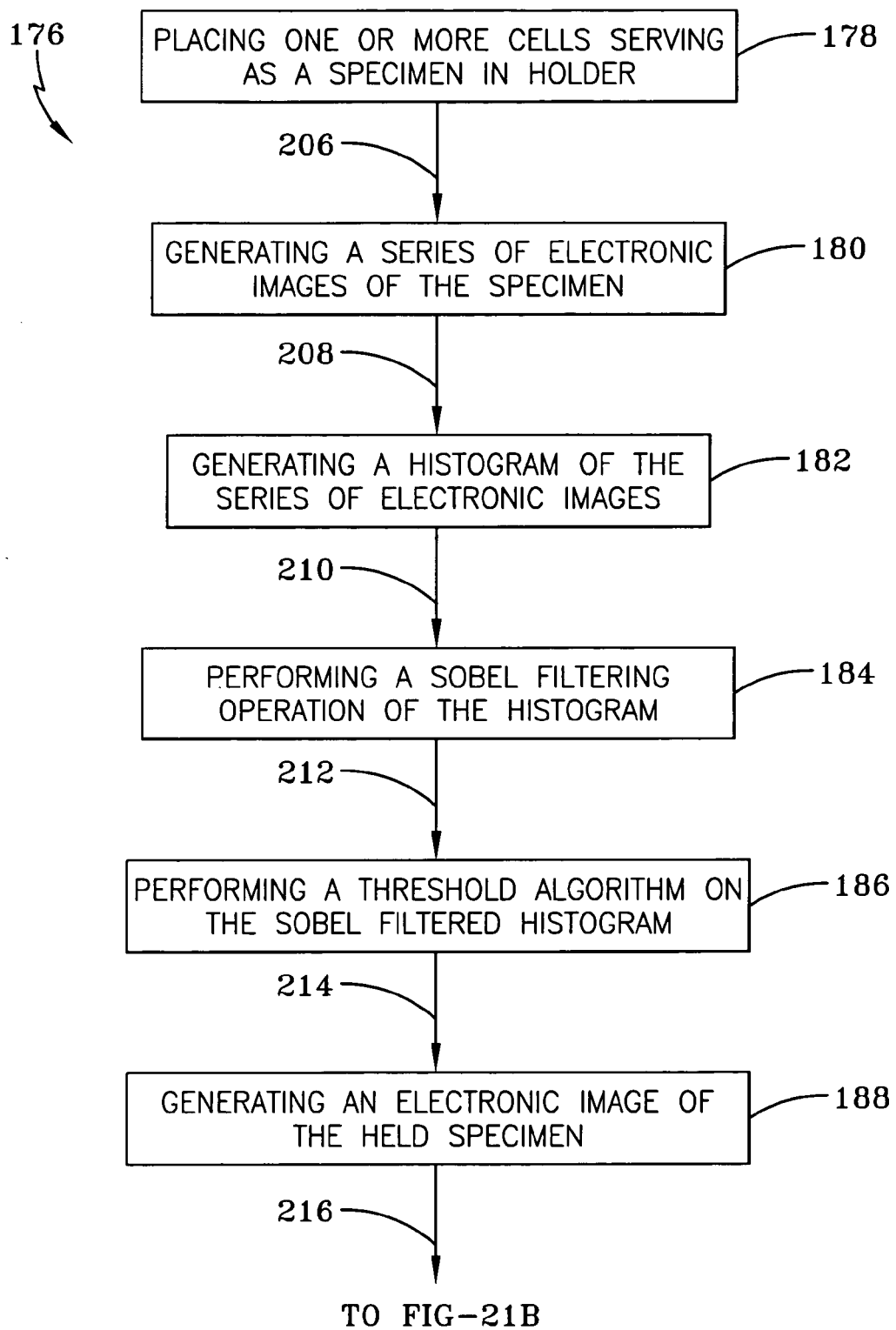
FIG. 21 is composed of FIGS. 21A and 21B that cumulatively illustrate a flow chart related to a still further method of the present invention.
Figure 21B:
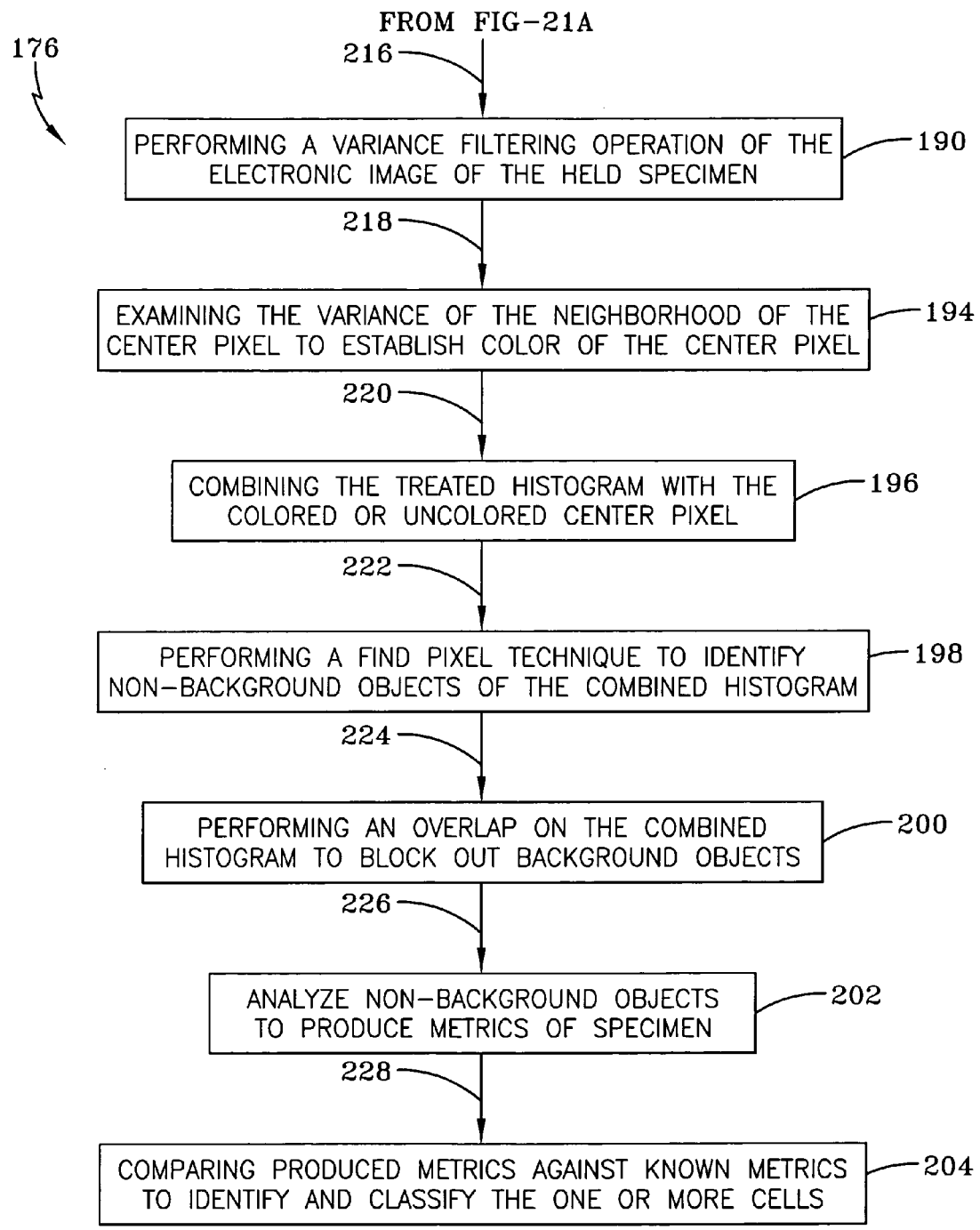

Another embodiment of the present invention that comprises a routine for cell identification and classification includes the matrix/statistics of one or more cells, may be further described with reference to FIG. 21 composed of FIGS. 21A and 21B, wherein FIG. 21A shows the overall method 176 as comprised of the elements 178, 180, 182, 184, 186, 188 and, similarly, FIG. 21B shows the overall method 176 as further comprised of elements 190, 194, 196, 198, 200, 202, and 204.

Figure 22:
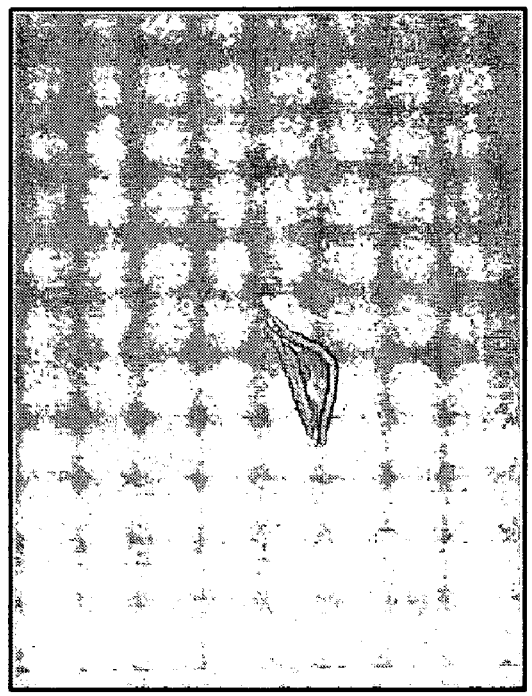
FIG. 22 illustrates an image of a candidate specimen related to the method of FIG. 21.

Cell identification for biomedical applications is done all around the world on a daily basis by thousands of humans looking through microscopes for hours at a time. The related technique of the present invention utilizes human information and incorporates that into an intelligent machine vision technique in order to develop a system capable of using only the best techniques for cell identification. The present invention provides a technique for the automatic detection of cell candidates for patch clamping, known in the art. This technique automatically identifies all possible cells in an image (Good & Bad). This technique also provides metrics/statistics, known in the art, on cells such as intensity-weighted center of mass (centroid), major axis length, minor axis length, area, roundness, smoothness, elongation, shape, partial cells, and cell orientation. FIG. 22 illustrates an example of a potential patch clamping candidate. The method 176 for cell identification may be further described again with reference to FIG. 21A.

As seen in FIG. 21A, the overall method 176 starts with segment 178 wherein the one or more cells serving as a specimen are placed in the holder. Upon completion, segment 178 sequences to program segment 180, by way of signal path 206.

Program segment 180 generates a series of electronic images of the specimen and then passes control to program segment 182, by way of signal path 208.

Program segment 182 generates a histogram having bars, which are proportional to the values of the intensity of the series of electronic images. In order to identify and classify cells, it is necessary to pre-process the images to allow isolation of the cells from their background. For the patch clamping images related to program segment 176, two parallel pre-processing paths are provided. The first path related to program segment 182 is a histogram illustration shown in FIG. 22. Upon completion, program segment 182 passes control to program segment 184, by way of signal path 210.

Figure 23:
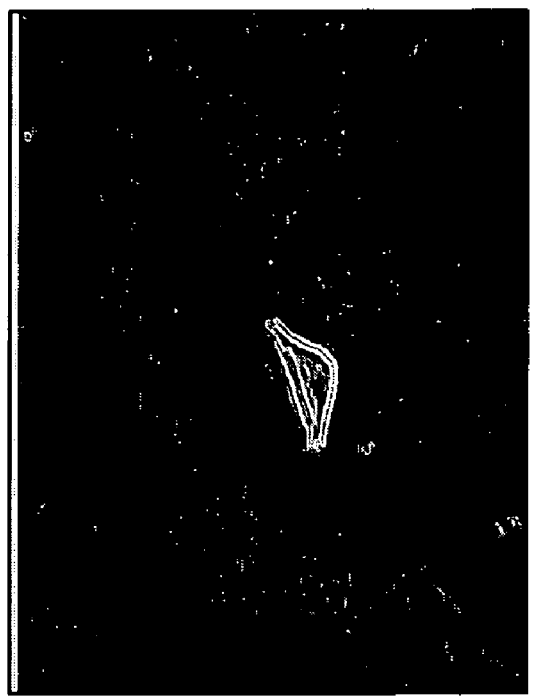
FIG. 23 illustrates a histogram that as received Sobel filtering operation all related to the method of FIG. 21.

Program segment 184 performs a Sobel filtering operation of the histogram so as to highlight the edges of the changes in the density of the histogram. The Sobel filter highlights the edges by finding changes in intensity thereof. The Sobel filtering technique is known in the art. FIG. 23 shows the image after receiving the histogram's treatment and the Sobel filtering operation. Upon completion, program segment 184 passes control to program segment 186, by way of signal path 212.

Program segment 186 performs a threshold algorithm previously described with reference to the brightness slicing technique of the present invention.

The threshold algorithm, serving as one of the algorithms 40, eliminates small intensity changes in the image provided to program segment 186. Program segment 186 clearly identifies particle boundaries, but does not always preserve cell connectivity (cell parameters often have gaps). This is corrected by allowing program segment 186 to pass control, via signal path 214, to program segment 188.

Program segment 188 causes the video microscope 12 to generate an electronic image, which is now used for the second path of the overall process 176 of FIG. 21. Upon completion, program segment 188 passes control, via signal path 216, to program segment 190 shown on FIG. 21B.

Figure 24:
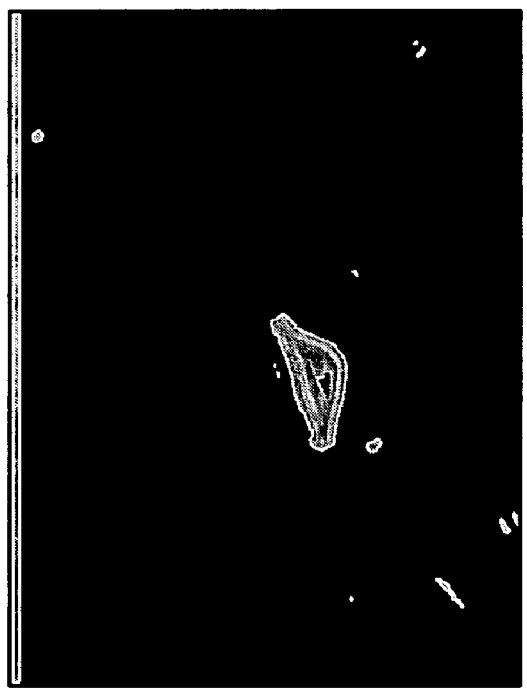
FIG. 24 illustrates an image after receiving variance filtering related to the method of FIG. 21.

Program segment 190 performs a variance filtering operation, serving as one of the algorithms 40, to produce an image thereof shown in FIG. 24. As the filter passes over the image, the variance, s, is computed as $$s^2 = \frac{1}{N}\sum_{i=1}^{N}(x_1 - \bar{x})^2,$$

where N is the number of pixels and $\bar{x}$ is the average in each neighborhood. Upon completion, program segment 190 passes, via signal path 218, control to program segment 194.

Figure 25:
FIG. 25 illustrates an image after receiving Sobel and variance filtering techniques all related to the method of FIG. 21.

Program segment 194 examines the variance of the neighborhood of the pixels. If the neighborhood of the center pixel has a low variance, the area is basically constant and the center of the pixel is set to black. More particularly, and with reference to FIG. 25, if the center pixel having a lip-like shape has a low variance, then the center of the lip-like shape is set to black. If the neighborhood has a high variance, intensity values are changing over the neighborhood and the center pixel is left unchanged. This approach preserves the connectivity of the cells and has no corruption of cell date, but is also includes some of the background as part of the cell. Upon completion, program segment 194 passes control to program segment 196, by way of signal path 220.

Figure 26:
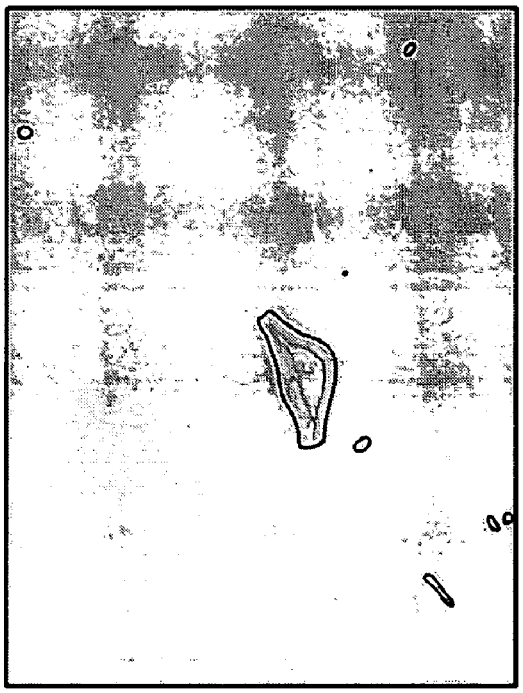
FIG. 26 illustrates an image after having all objects therein identified and related to the method of FIG. 21.

Program segment 196 combines the treated histogram program segment 186 with the colored or uncolored center pixel of program segment 194 that results in an image shown in FIG. 26. Upon completion, 196 passes control to program segment 198, by way of signal path 222.

Program segment 198 performs a find pixel technique to identify non-background objects of the combined histogram of program segment 196 in a manner as previously described with reference to FIG. 9.

Program segment 198, as well as other program segments of the present invention, may employ a clean technique that cleans the image using a center-deleted spike filter modified to remove noise not associated with particles. The clean technique is arranged to work on images with a black background. The mask size designates the extent of the neighborhood around the current pixel that will determine its output value. A clutter threshold, known in the art, represents the cutoff for the sum of pixel values lying within the mask region (except the center pixel). If the sum is less than the clutter threshold, the center pixel will be set to 0. A significance threshold represents the cutoff for a given pixel value to be considered significant. If the center pixel is below the significance threshold, it will be set to 0. When cleaning a binary image, the significance threshold is not necessary since all pixels are either white (255) or black (0), so it is set to 0.

Upon completion, program segment 198 passes control to program segment 200, by way of signal path 224.

Program segment 200 performs an overlay technique, known in the art, on the combined histogram to block out background objects and provides an image such as that shown in FIG. 26. Upon completion, program segment 200 passes control to program segment 202, by way of signal path 226.

Program segment 202 analyzes the non-background objects to produce matrix of the specimen being held in the holder.

TABLE 3

| # id | x | y | major | minor | area | elong | round | smooth theta | thin | prtl |
|---|---|---|---|---|---|---|---|---|---|---|
| 1 | 517.1 | 18.3 | 14.9 | 8.8 | 117 | 0.589 | 2.169 | 0.184 | 98 F | F |
| 2 | 289.3 | 274.9 | 124.5 | 66.5 | 4882 | 0.534 | 0.178 | 0.143 | 22.6 F | F |
| 3 | 84.2 | 310 | 3.5 | 2.7 | 16 | 0.776 | 0.88 | 0.154 | 31.7 F | F |
| 4 | 388.4 | 313.4 | 6.4 | 3.2 | 24 | 0.495 | 0.93 | 0.183 | 37 F | F |
| 5 | 227.2 | 330.7 | 16.7 | 11.2 | 155 | 0.67 | 0.967 | 0.16 | 114.9 F | F |
| 6 | 602.9 | 369.1 | 4.7 | 3.2 | 21 | 0.674 | 1.817 | 0.115 | 135 F | F |
| 7 | 594.5 | 373.9 | 11.9 | 6.1 | 62 | 0.515 | 0.697 | 0.19 | 137.6 F | F |
| 8 | 91.1 | 400.9 | 37.8 | 9.4 | 202 | 0.249 | 0.232 | 0.161 | 42.2 F | F |
| 9 | 151.9 | 451.3 | 16.4 | 7.6 | 99 | 0.462 | 0.535 | 0.169 | 26.1 F | F |
| 10 | 158.7 | 463.4 | 13.7 | 9.9 | 106 | 0.723 | 0.898 | 0.174 | 43.5 F | F |

Based on the information listed in Table 3, program segment 202 can classify an ideal patch clamping candidate by its major axis, minor axis, area, elongation, roundness, smoothness, theta (orientation with respect to a coordinate system), thinness, and whether the object is completely (F) contained in the field of view or only partially contained (partial). Program segment 202 passes control, via signal path 228, to program segment 202.

Program segment 204 compares the produced metrics of Table 3 against known metrics to identify and classify the one or more cells being held in the holder 14.

Figure 27:
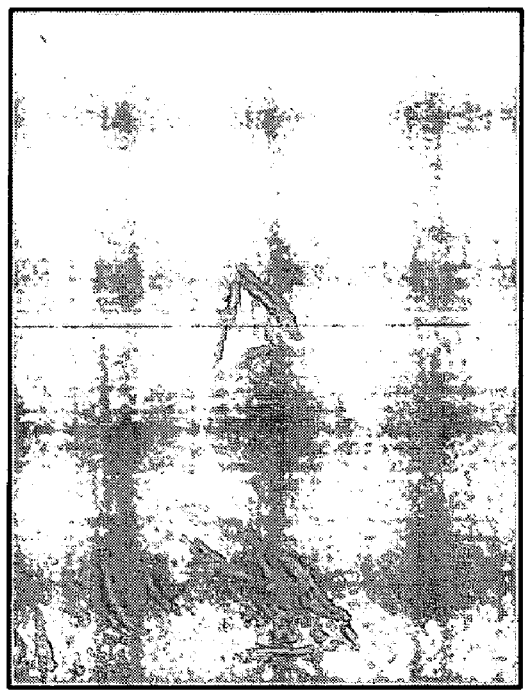
FIG. 27 illustrates an image of a second candidate specimen related to the method of FIG. 21.

The result from our technique practicing the method 176 of FIG. 4 and starting with the image of FIG. 27 yielded the following Table 4.

TABLE 4

| # id | x | y | major | minor | area | elong | round | smooth theta | thin | prtl |
|---|---|---|---|---|---|---|---|---|---|---|
| 1 | 72.1 | 89.4 | 191.8 | 126.7 | 12491 | 0.661 | 0.077 | 0.143 | 137 F | T |
| 2 | 597.3 | 33.1 | 49.9 | 44.9 | 844 | 0.899 | 0.18 | 0.162 | 1.2 F | T |
| 3 | 564.9 | 11.8 | 6.8 | 3.7 | 27 | 0.537 | 0.908 | 0.203 | 40.3 F | F |
| 4 | 575.4 | 28.2 | 17.3 | 9.3 | 114 | 0.536 | 0.449 | 0.1 | 83.3 F | F |
| 5 | 559.1 | 21.3 | 4 | 2.5 | 15 | 0.615 | 0.943 | 0.159 | 80.8 F | F |
| 6 | 629.1 | 41 | 3.4 | 2.3 | 13 | 0.676 | 0.99 | 0.205 | 103.3 F | T |
| 7 | 628.6 | 51.2 | 12 | 4 | 38 | 0.333 | 0.489 | 0.144 | 90 T | T |
| 8 | 594.8 | 97.5 | 16 | 14 | 175 | 0.876 | 0.884 | 0.168 | 4.7 F | F |
| 9 | 168.7 | 107.6 | 4 | 4 | 19 | 1 | 1.775 | 0.167 | 0 F | F |
| 10 | 93.1 | 238.7 | 247.1 | 117.3 | 14243 | 0.475 | 0.093 | 0.139 | 44.7 T | F |
| 11 | 598.9 | 128.9 | 35.8 | 14.6 | 277 | 0.409 | 0.323 | 0.185 | 99.4 F | F |
| 12 | 614.3 | 132.3 | 22.1 | 5.5 | 121 | 0.25 | 0.361 | 0.161 | 76.5 F | F |
| 13 | 623.2 | 146.4 | 5.4 | 1.9 | 15 | 0.346 | 0.619 | 0.135 | 74 F | F |
| 14 | 629.6 | 158.2 | 3.2 | 1 | 7 | 0.302 | 0.752 | 0.188 | 74.5 F | T |
| 15 | 342.4 | 223.3 | 121.6 | 88.4 | 6417 | 0.727 | 0.301 | 0.141 | 160.6 F | F |
| 16 | 623.8 | 185.2 | 6.7 | 4.1 | 26 | 0.618 | 0.965 | 0.2 | 58.3 F | F |
| 17 | 600.6 | 371 | 5.1 | 3.8 | 21 | 0.744 | 1.805 | 0.188 | 125.8 F | F |
| 18 | 593.4 | 376.9 | 6.7 | 5 | 31 | 0.739 | 1.269 | 0.203 | 137.4 F | F |
| 19 | 100.8 | 392.3 | 8 | 4.6 | 34 | 0.572 | 0.994 | 0.147 | 36 F | F |
| 20 | 149.5 | 453 | 9.4 | 5 | 50 | 0.535 | 0.845 | 0.125 | 26.6 F | F |
| 21 | 155.4 | 464.9 | 5.4 | 2.2 | 15 | 0.396 | 0.75 | 0.25 | 5.7 F | F |

By looking at the results listed in Table 4, it is clear that cell 15 of Table 4 is the ideal candidate because it most closely matches the metrics identified for an ideal patch clamping candidate cell. This is a significant advancement in the field of patch clamping because we now have the ability to automatically scan through a sample specimen and identify ideal cell candidates with no human interaction. The technique has proven to be more efficient over time than an actual human who has to look at each and every cell sample over a period of hours.

Figure 28:
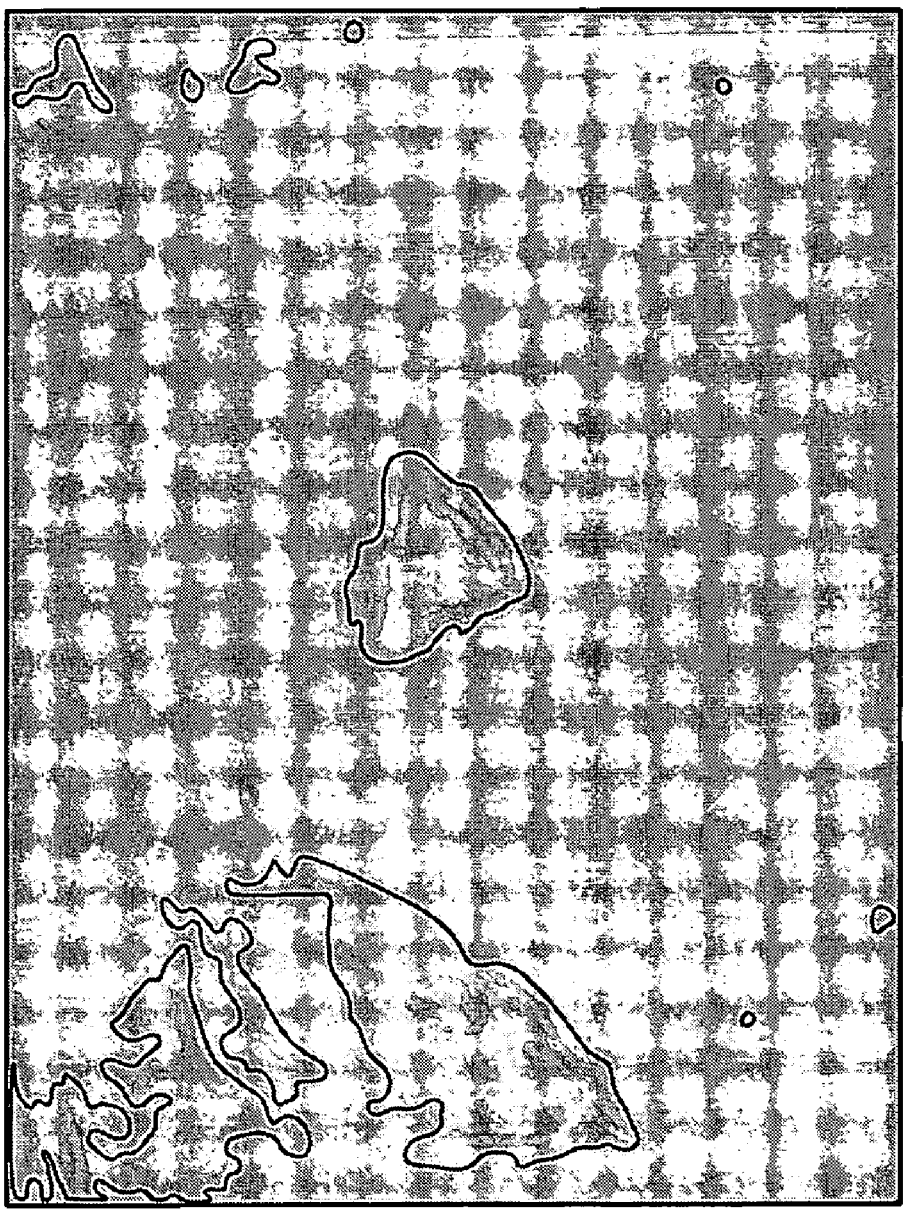
FIG. 28 illustrates the result of the image of FIG. 27 after having received the operation of the method of FIG. 21.

A second example resulting from the patch clamping technique of the present invention is illustrated in FIG. 28.

Another method of the practice of the present invention provides for a routine that identifies one or more cells in an area of interest, which cell is closest to the center of the area interest, the nearest neighbors of each cell within the area of interest and tracks movements of the cells within the area of interest routine for cell identification. The method may be further described with reference to FIG. 29 for an overall program 230 having elements 232, 234, 236, and 238.

Figure 29:
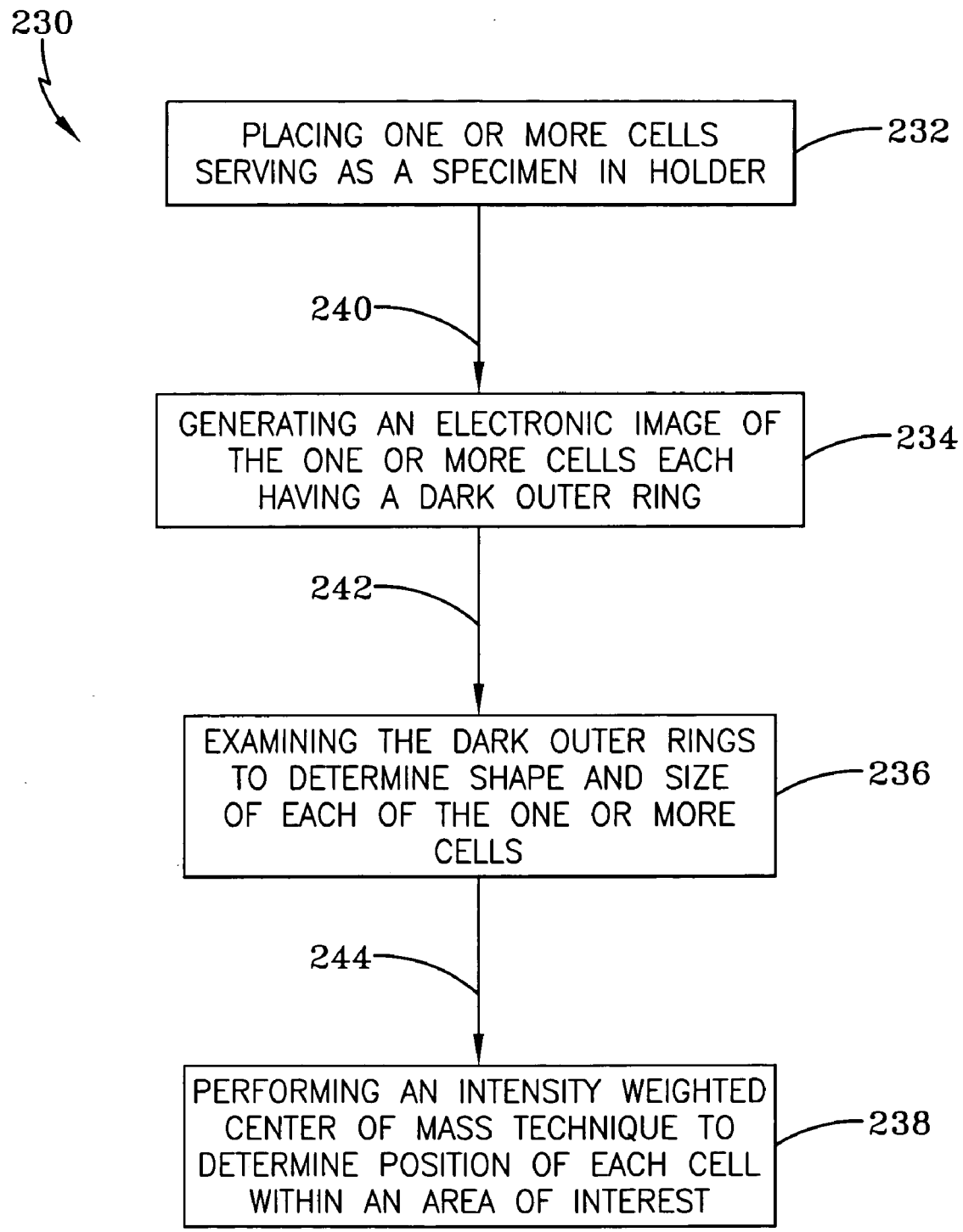
FIG. 29 illustrates a flow chart related to another method of the present invention.

As seen in FIG. 29, the overall method starts with segment 232 which signifies one or more cells, serving as a specimen, are placed in the holder 14. Upon completion, segment 232 gives control to program segment 234, by way of signal path 240.

Figure 30:
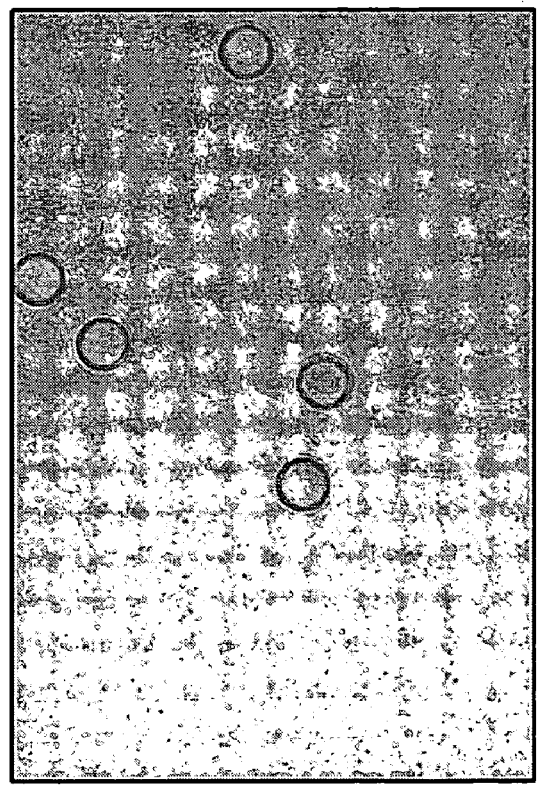
FIG. 30 illustrates the original cell image related to the method of FIG. 29.

Program segment 234 generates an electronic image, such as that shown in FIG. 30, of the one or more cells, each having a dark outer ring. Upon completion, program segment 234 passes control to program segment 236, by way of signal path 242.

Figure 31:
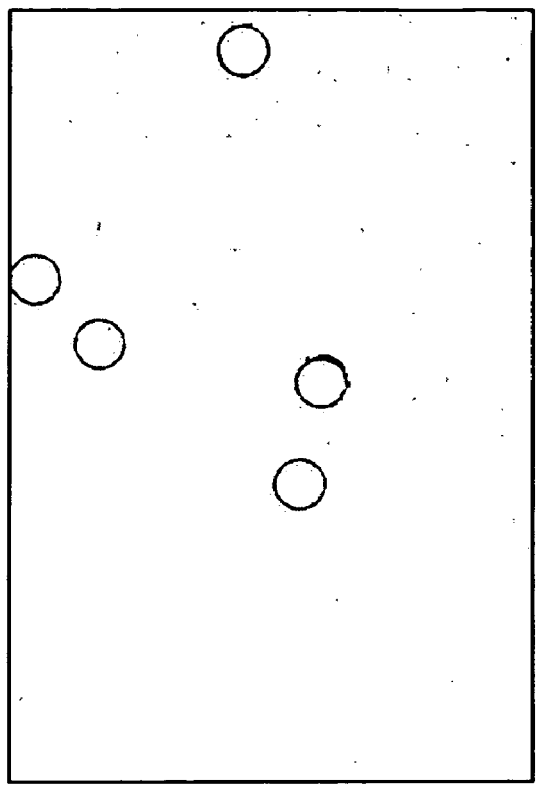
FIG. 31 illustrates an image processed by the method of FIG. 29.

Program segment 236 examines the dark outer ring of each cell to determine the shape and size of the one or more cells. By concentrating on the dark outer ring of each cell, it allows for determination of the shape and size of the cell, but prior to the examination the cells may have an image such as that of FIG. 31. Upon completion, program segment 236 passes control to program segment 238, by way of signal path 244.

Program segment 238 performs an intensity weighted center of mass technique to determine the position of each cell within the area of interest. The intensity weighted center of mass technique is known in the art and serves as one of the algorithms 40.

Figure 33:
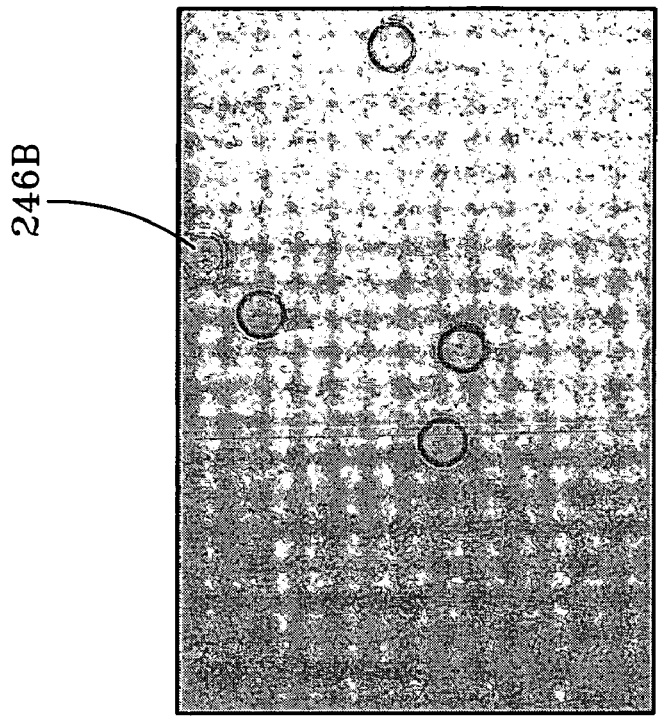
FIG. 33 illustrates an original image with the cells labeled and associated with the method of FIG. 29.
Figure 32:
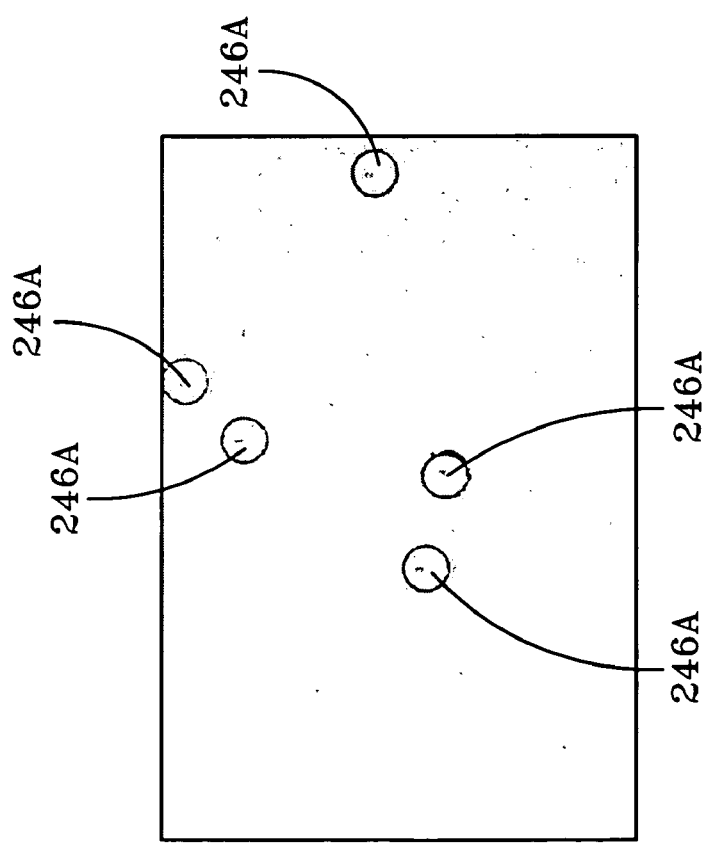
FIG. 32 illustrates an image that had been labeled process by the method of FIG. 29.

The intensity weighted center of mass technique determines the position of each cell to each other. The program segment 238 then labels the cell based on the information of each center with a labeled process image such as that shown in FIG. 32 and the original image with the cells labeled shown in FIG. 33. The center of each cell is identified in FIG. 32 by reference number 246A. The partial particles shown in FIG. 33 by reference number 246B can be classified as such and then perimeters within the image can be determined.

It should now be appreciated that the practice of the present invention provides a procedure that seeks to maintain high accuracy and repeatable techniques for cell identification in the medical industry. It is contemplated that this technique also reduces, by a significant amount, the amount of lost time human error typically creates.

Figure 34:
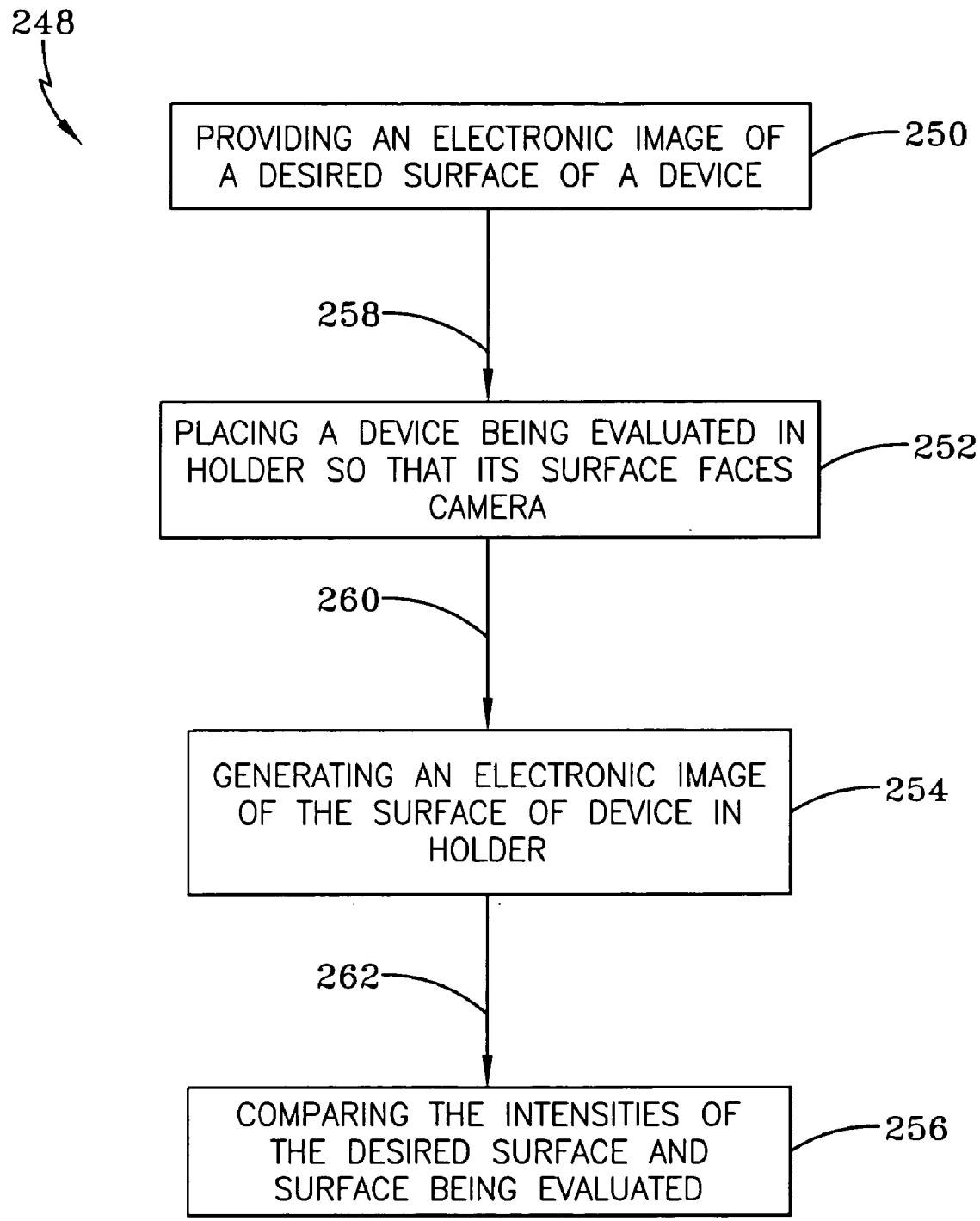
FIG. 34 is a flow chart related to an additional method of the present invention.

Another embodiment provided by the machine vision techniques of the present invention comprises a routine for evaluating surfaces of devices, such as semiconductor devices and is shown in FIG. 34, and an overall program 248 comprised of elements 250, 252, 254, and 256.

The technique illustrated by FIG. 34 utilizes an ideal or representative surface and treats this ideal surface as the standard for evaluating remaining samples. Each surface to be analyzed is compared to the standard and if it meets certain tolerance metrics, it will be approved for use. The goal in this technique is to categorize good or acceptable surfaces vs. bad or unacceptable surfaces. By classifying the surface defects, the present invention labels and categorizes each defect as it appears in an area of interest. The surface classification technique works by isolating any defects on a given surface and transforming the pixel information into an objective measure of surface quality that can be compared to the ideal case.

As seen in FIG. 34, the program 248 is initiated by a program segment 250, which provides an electronic image of a desired surface of a device. The electronic image of program segment 252 possesses an intensity representative of the critical value of the desired surface. Upon completion, program segment 250 passes control to program segment 252, by way of signal path 258.

Program segment 252 represents the placement of the device in the holder so that its surface faces the camera of the video microscope 12. Upon completion, program segment 252 passes control to program segment 254, by way of signal path 260.

Figure 37:
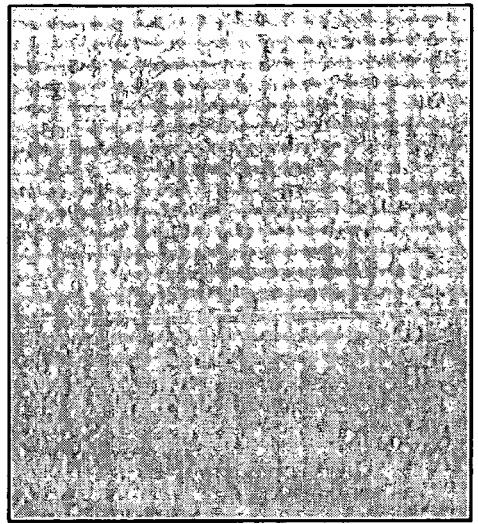
FIG. 37 illustrates another defective surface detected by the method of FIG. 34.
Figure 35:
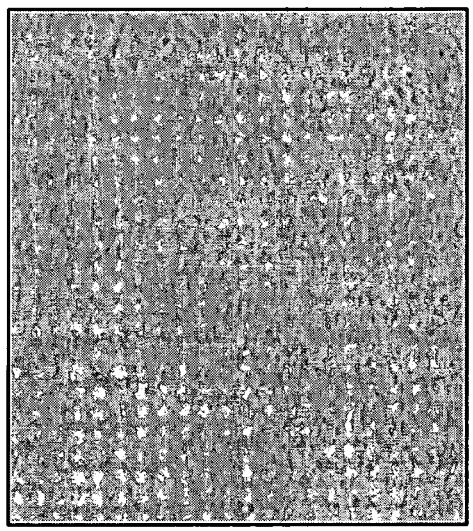
FIG. 35 is an image of an ideal case surface related to the method of FIG. 34.
Figure 36:
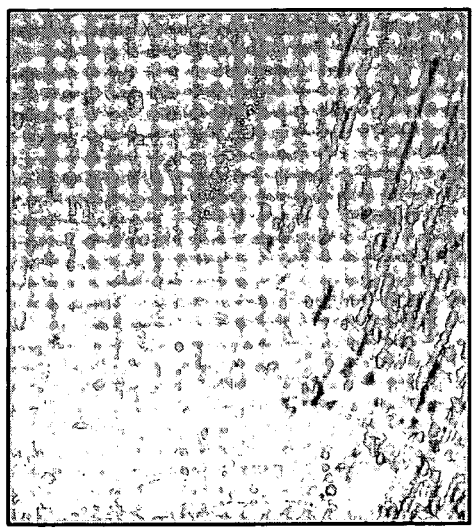
FIG. 36 illustrates a defective surface detected by the method of FIG. 34.

Program segment 254 generates an electronic image of the surface of the device in the holder. This electronic image includes a morphological gradient operation (known in the art), which is performed on the image to find feature edges. This operation creates an edge-enhanced image of the boundaries of the features in the image, such as that shown on the lower portion of FIG. 36 The outlines represent the portions of the image where the steep dark-to-bright and dark-to-dark transition occurs. Then a center deleted spike filter, previously discussed with reference to FIG. 21, is applied to remove one-pixel duration variations and small features of the pixel. The pixels in the resulting image are summed to provide a measure of surface quality. Surface quality for each case is then compared to the critical value represented by the ideal surface. FIG. 35 represents a smooth or ideal surface, whereas FIGS. 36 and 37 show examples of the same type of surface exhibiting defects. The surface quality value for each case is compared to the critical value represented by the ideal case of FIG. 35. If a surface has an intensity value greater than the ideal surface as in the cases of FIGS. 36 and 37, it may be classified as being defective. The critical value can be adjusted for various types of surfaces.

Figure 38:
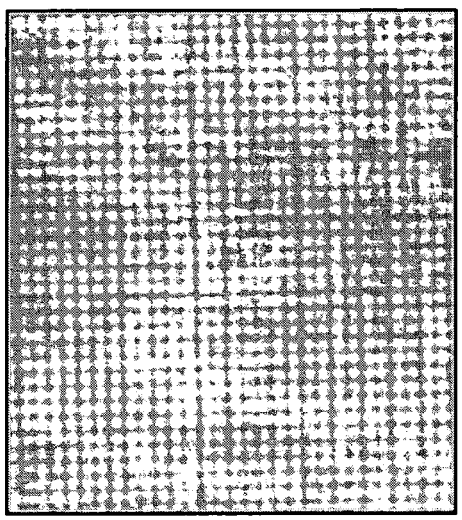
FIG. 38 illustrates an ideal surface of another semiconductor device related to the method of FIG. 34.
Figure 40:
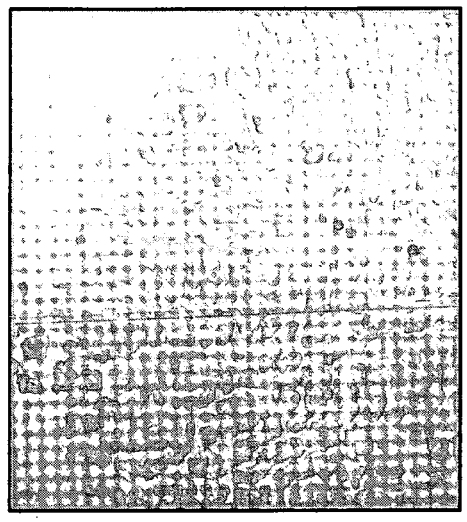
FIG. 40 illustrates another defective surface detected by the method of FIG. 34.
Figure 39:
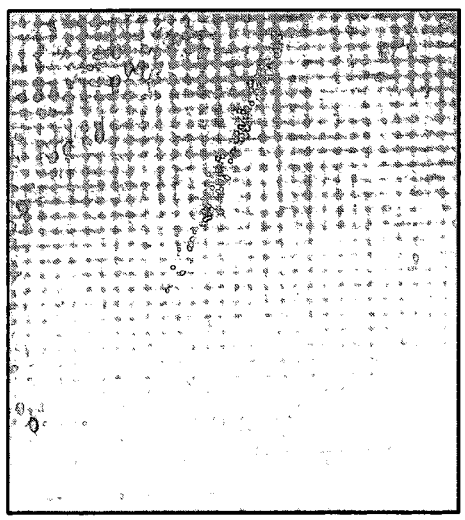
FIG. 39 illustrates a second defective surface detected by the method of FIG. 34.

A second ideal surface is shown in FIG. 38 which represents an ideal case, and FIGS. 39 and 40 show defect samples of the same type of surface related to FIG. 38. To accommodate all of this analysis, program segment 254 passes control to program segment 256, by way of signal path 262. Program segment 256 completes all the comparisons of the intensity of a desired surface and the surface being evaluated.

The surface classification technique represented by FIG. 34 allows an ideal surface to be stored in an image database and retrieved for comparison of similar surfaces that can be used for in-line process inspection or for an automatic design system to accept or reject a surface based on the ideal surface.

It should now be appreciated that the practice of the present invention provides a CMIS that can conduct experiments using microscopes without the need of constant monitoring. Further, the CMIS allows for the analysis of microscopic experiments automatically and remotely. Still further, the CMIS provides a utilization of intelligence allowed by adapted neural networks to cause the desired feed-back resulting in accurate and repeatable results.

It should be still further appreciated that the CMIS scans, finds areas of interest, focuses and acquires images automatically. It should be further appreciated that the CMIS allows for the evaluation of surfaces of devices, such as semiconductors to be accurately and quickly determined.

The invention has been described with reference to preferred embodiments and alternates thereof. It is believed that many modifications and alteration to the embodiments as described herein will readily suggest themselves to those skilled in the art upon reading and understanding the detailed description of the invention. It is intended to include all modifications and alterations insofar as they come within the scope of the present invention.

What is claimed is:

1. A method for examining microscope specimens comprising the steps of:
    a) providing a video microscope having a holder for specimens and a camera located so as to be focussed on said holder and providing an output representative of the electronic image of said specimen;
    b) providing a light source operatively connected to said video microscope for illuminating said specimens being held in said holder;
    c) providing a robotic system responsive to electrical signals and operatively connected to and for positioning said video microscope; and
    d) providing a computer having a display terminal and operatively connected to said output of said camera and providing said electrical signals to said robotic system, said computer having operating programs comprising routines for providing machine vision techniques for autonomously scanning, identifying, detecting and tracking and displaying on said display terminal selected characteristics and features of said specimen, said machine vision techniques including routines for an adaptive morphological feature based object classifier employing a probabilistic feature mapping of objects in a selected image by utilizing no less than thirteen (13) feature metrics comprising; bounding box (FM1), intensity-weighted center of mass (FM2), intensity/color statistics (FM3) major axis length (FM4), minor axis length (FM5), major axis orientation, theta, (FM6), area (FM7), elongation (FM8), roundness (FM9), smoothness (FM10), partiality (FM11), circumference (FM12) and perimeter count (FM13), and wherein said routines for producing machine vision techniques comprise a routine that identifies one or more cells in an area of interest, which cell is closest to the center of the area of interest, the nearest neighbors of each cell within the area of interest, and track movement of the cells within the area of interest; said routine for said identification of all cells comprises the steps of:
    a) placing said one or more cells comprising a specimen in said holder;
    b) causing said video microscope to generate an electronic image of said one or more cells, each of said one or more cells of said electronic image having a dark outer ring;
    c) examining said dark outer ring of each cell so as to determine the shape and size of each of said one or more cells; and
    d) performing an intensity weighted center of mass technique utilizing the shape and size of each cell to determine the center of each cell which, in turn, defines the position of each cell relative to each other, wherein the area enclosing the positions of the one or more cells along with outer ring of each cell defining the perimeters of the one or more cells determines said area of interest.

* * * * *